(12) United States Patent
Riggert

(10) Patent No.: US 10,997,381 B2
(45) Date of Patent: May 4, 2021

(54) SYSTEMS AND METHODS FOR USING RADIO FREQUENCY IDENTIFICATION AS AN ADAPTIVE ALARM THRESHOLD

(71) Applicant: Eric F. Riggert, Trabuco Canyon, CA (US)

(72) Inventor: Eric F. Riggert, Trabuco Canyon, CA (US)

(73) Assignee: SENSORMATIC ELECTRONICS, LLC, Boca Raton, FL (US)

( * ) Notice: Subject to any disclaimer, the term of this patent is extended or adjusted under 35 U.S.C. 154(b) by 0 days.

(21) Appl. No.: 16/721,177

(22) Filed: Dec. 19, 2019

(65) Prior Publication Data

US 2020/0226333 A1    Jul. 16, 2020

Related U.S. Application Data

(60) Provisional application No. 62/790,586, filed on Jan. 10, 2019.

(51) Int. Cl.
```
G06K 7/10      (2006.01)
G08B 13/24     (2006.01)
G06Q 10/08     (2012.01)
```
(52) U.S. Cl.
CPC ....... *G06K 7/10425* (2013.01); *G06Q 10/087* (2013.01); *G08B 13/2417* (2013.01); *G08B 13/2485* (2013.01)

(58) Field of Classification Search
CPC ............. G06K 7/10425; G06Q 10/087; G08B 13/2417; G08B 13/2485

USPC ..................................................... 340/572.1
See application file for complete search history.

(56) References Cited

U.S. PATENT DOCUMENTS

| | | | |
|---|---|---|---|
| 6,653,940 B2* | 11/2003 | Collura | B65H 75/182 340/572.8 |
| 2013/0169413 A1 | 7/2013 | Schuessler | |
| 2014/0225735 A1 | 8/2014 | Hosseini et al. | |
| 2015/0120534 A1* | 4/2015 | Cardwell | G06Q 20/42 705/39 |

FOREIGN PATENT DOCUMENTS

| WO | 20130192033 A1 | 12/2013 |
|---|---|---|
| WO | 2015161359 A1 | 10/2015 |

OTHER PUBLICATIONS

International Search Report and Written Opinion Issued for PCT/US2019/067571, dated Mar. 18, 2020.

* cited by examiner

*Primary Examiner* — John A Tweel, Jr.
(74) *Attorney, Agent, or Firm* — Arent Fox LLP

(57) ABSTRACT

Systems and methods for operating an Electronic Article Surveillance ("EAS") system. The methods comprise: detecting movement of a plurality of security tags in a facility using Radio Frequency Identification ("RFID"); identifying which security tags of the plurality of security tags are moving towards an exit of the facility or are in a surveillance zone; determining a number of the identified security tags that are coupled to unsold objects; comparing the number to a threshold value; and causing the EAS system to issue an alarm when the number is greater than or equal to the threshold value.

22 Claims, 15 Drawing Sheets

FIG. 10

Tag Response Message 1000
- Unique Tag Identifier 1002

FIG. 11

Tag Response Message 1100
- Unique Tag Identifier 1102
- Motion Indicator 1104

SYSTEMS AND METHODS FOR USING RADIO FREQUENCY IDENTIFICATION AS AN ADAPTIVE ALARM THRESHOLD

CROSS-REFERENCE TO RELATED APPLICATIONS

The present application claims the benefit of U.S. Patent Provisional Application No. 62/790,586 which was filed on Jan. 10, 2019. This Provisional Application is incorporated herein in its entirety.

BACKGROUND

Statement of the Technical Field

The present disclosure relates generally to Electronic Article Surveillance ("EAS") systems. More particularly, the present disclosure relates to systems and methods for using a Radio Frequency Identification ("RFID") as an adaptive alarm threshold.

Description of the Related Art

EAS detection systems generally comprise an interrogation antenna for transmitting an electromagnetic signal into an interrogation zone, markers which respond in some known electromagnetic manner to the interrogation signal, an antenna for detecting the response of the marker, a signal analyzer for evaluating the signals produced by the detection antenna, and an alarm which indicates the presence of a marker in the interrogation zone. The alarm can then be the basis for initiating one or more appropriate responses depending upon the nature of the facility. Typically, the interrogation zone is in the vicinity of an exit from a facility such as a retail store, and the markers can be attached to articles such as items of merchandise or inventory.

RFID systems are commonly used in EAS systems for monitoring goods and equipment and recording information on the target item. An RFID system typically includes an RFID reader and an RFID device such as a tag or label. The RFID reader may transmit a Radio-Frequency ("RF") carrier signal to the RFID device. The RFID device may respond to the RF carrier signal (or interrogator signal) with a data response signal (or authentication reply signal) encoded with information stored on the RFID device. RFID devices may store information such as a unique identifier or an Electronic Product Code ("EPC") associated with an article or item.

The EAS/RFID systems suffer from certain drawbacks. For example, false alarms are issued by the EAS detection systems. These false alarms damage user trust of the EAS detection systems and lower user confidence in the EAS detection systems. Also, alarming based on RFID reads and antenna locations is inexact which contributes to the nuisance of the EAS detection systems. Even with complex algorithms to improve performance, false or nuisance alarms are often caused by RF reflection from moving and stationary people, metal furniture, glass and metal doors. These reflections cause RFID-tagged inventory placed near an exit to alarm in EAS/RFID systems.

One solution for solving the above drawbacks of the EAS/RFID systems is to place merchandise further away from exits. This solution causes retailers to lose valuable floor space.

SUMMARY

This document concerns implementing systems and methods for operating an EAS system. The methods comprise: detecting movement of a plurality of security tags in a facility using RFID; identifying which security tags of the plurality of security tags are moving towards an exit of the facility or are in a surveillance zone; determining a number of the identified security tags that are coupled to unsold objects; comparing the number to a threshold value; and causing the EAS system to issue an alarm when the number is greater than or equal to the threshold value.

The methods may also comprise: suppressing the EAS system's alarming when the number is less than the threshold value; and/or reporting a loss when the EAS system's alarming is suppressed.

The methods may further comprise causing the EAS system to issue a discreet alarm when the number is less than the threshold value. The discreet alarm can include, but is not limited to, a visual alarm output at an exit of the facility or at a location remote from the exit. The discreet alarm may be absent of any auditory sound.

In some scenarios, the methods comprise: reporting a loss when the number is greater than or equal to the threshold value; and/or automatically modifying the threshold value based on certain criteria. The threshold value is reduced when an alarm rate per unit of time is below a given value. The threshold value is increased when an alarm rate per unit of time is above a given value.

BRIEF DESCRIPTION OF THE DRAWINGS

The present solution will be described with reference to the following drawing figures, in which like numerals represent like items throughout the figures.

FIG. 10 is an illustration of a tag response message.

FIG. 11 is an illustration of another tag response message.

DETAILED DESCRIPTION

Figure 1:
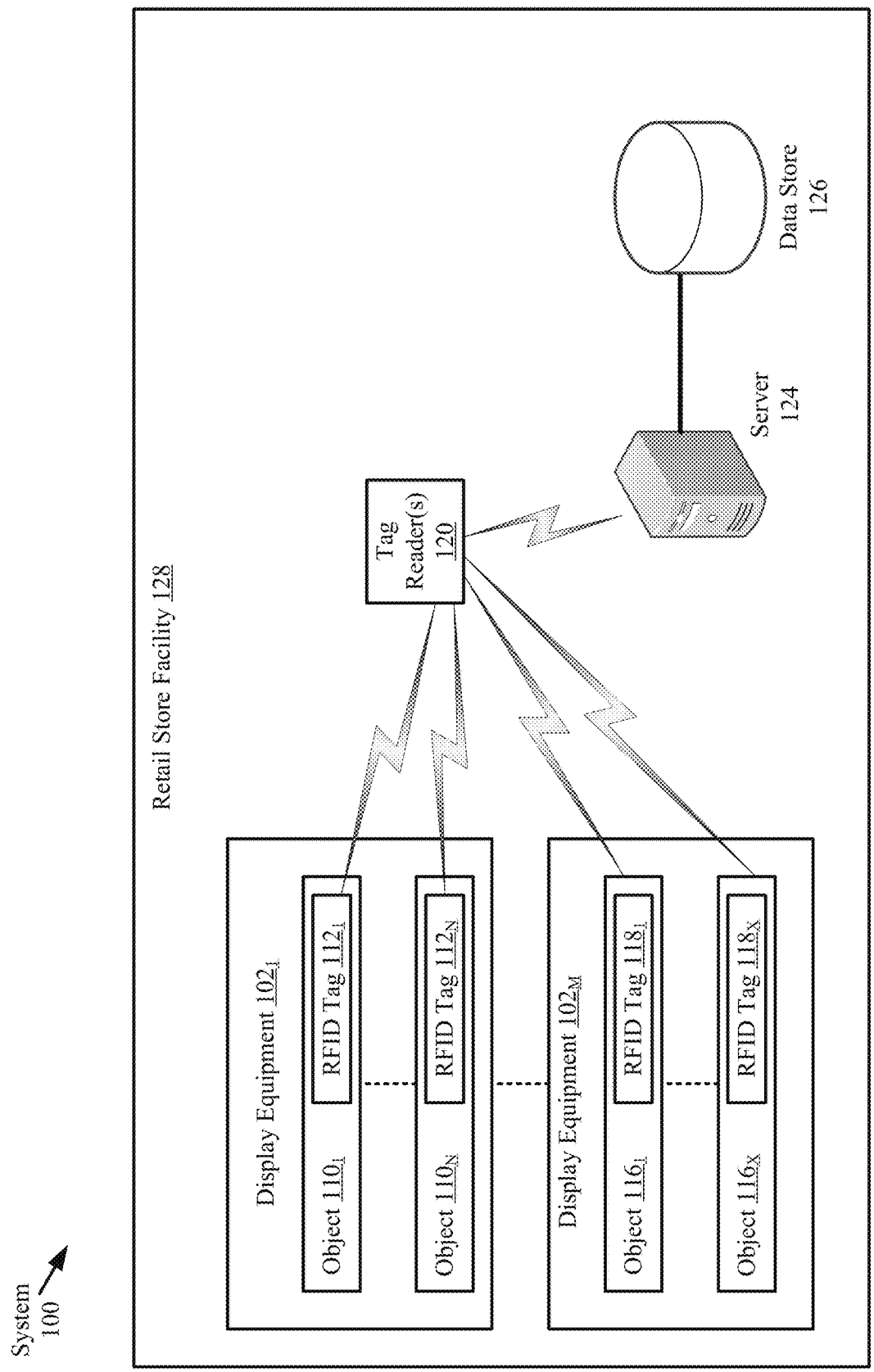
FIG. 1 is an illustration of an illustrative architecture for a system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The present solution concerns systems and methods for using RFID as an adaptive alarm threshold. The present solution provides EAS/RFID systems with an ability to place inventory closer to exits without having false alarms or nuisance alarms, and an ability to reduce nuisance alarms while still offering reporting visibility at a back room for all loss events.

The methods generally involve: detecting movement of a plurality of security tags in a facility using RFID; identifying which security tags of the plurality of security tags are moving towards or through an exit of the facility; determining a number of the identified security tags that are coupled to unsold objects; comparing the number to a threshold value; and causing the EAS system to issue an alarm when the number is greater than or equal to the threshold value. Thus, the EAS system's alarming may be suppressed when the number is less than the threshold value, thereby reducing the perception of false alarms due to sporadic or occasional stray tag reads/detections. Regardless of whether an alarm is suppressed or issued, all associated RFID tags determined to have exited the facility may be reported to an inventory tracking system to update inventory cycle count information. The threshold value can be manually or automatically modified based on certain criteria. For example, the threshold value is reduced when an alarm rate per unit of time is below a given value and/or increased when an alarm rate per unit of time is above a given value.

In scenarios where a system is creating a flood of false alarms, the system may self-determine that it is causing a nuisance and take certain actions in response to this self-determination. The actions include, but are not limited to, suppressing further alarms, and/or opting not to send potentially inaccurate updated cycle count information to an inventory server. This is most likely to be useful when handling system failures that cause a continuous false alarm, rather than occasional false alarming due to the vagaries of RF physics and stray tag reads coupled with customer merchandise too close to the exit. Any threshold to catch this type of failure should be set high enough to be physically impossible to achieve by actually stealing merchandise in large quantities.

The present solution is applicable in various types of RFID and/or EAS based systems. For example, the present solution can be employed in systems described in U.S. Pat. No. 9,519,811 to Simon et al. The present solution can also be employed in systems where tags communicate in accordance with timeslot assignments. Such a timeslot based system is described below in relation to FIGS. 1-12. The present solution is not limited to use with these two described systems.

Time Slot Based Inventory Systems

Referring now to FIG. 1, there is provided a schematic illustration of an illustrative system 100 that is useful for understanding the present solution. The present solution is described herein in relation to a retail store environment. The present solution is not limited in this regard, and can be used in other environments. For example, the present solution can be used in distribution centers, factories and other commercial environments. Notably, the present solution can be employed in any environment in which objects and/or items need to be located and/or tracked.

The system 100 is generally configured to allow improved inventory counts of objects and/or items located within a facility. As shown in FIG. 1, system 100 comprises a Retail Store Facility ("RSF") 128 in which display equipment $102_1, \ldots, 102_M$ (collectively referred to as "102") is disposed. The display equipment is provided for displaying objects (or items) $110_1$-$110_N$ (collectively referred to as "110"), $116_1$-$116_X$ (collectively referred to as "116") to customers of the retail store. The display equipment can include, but is not limited to, shelves, article display cabinets, promotional displays, fixtures and/or equipment securing areas of the RSF 128. The RSF can also include emergency equipment (not shown), checkout counters, an EAS system (not shown), an RFID system, and/or an RFID/EAS system. Emergency equipment, checkout counters, video cameras, people counters, EAS systems, RFID systems, and/or RFID/EAS systems are well known in the art, and therefore will not be described herein.

At least one tag reader 120 is provided to assist in counting the objects $110_1$-$110_N$, $116_1$-$116_X$ located within the RSF 128. The tag reader 120 comprises an RFID reader configured to read RFID tags. RFID readers are well known in the art, and therefore will not be described herein. Any known or to be known RFID reader can be used herein without limitation.

RFID tags $112_1$-$112_N$ (collectively referred to as "112"), $118_1$-$118_X$ (collectively referred to as "118") are respectively attached or coupled to the objects $110_1$-$110_N$, $116_1$-$116_X$. The RFID tags are described herein as comprising single-technology tags that are only RFID enabled. The present solution is not limited in this regard. The RFID tags can alternatively or additionally comprise dual-technology tags that have both EAS and RFID capabilities. In some scenarios, the RFID enabled tags comprise RFID thread based tags.

Notably, the tag reader 120 is strategically placed at a known location within the RSF 128. By correlating the tag reader's RFID tag reads and the tag reader's known location within the RSF 128, it is possible to determine the location of objects $110_1$, ..., $110_N$, $116_1$, ..., $116_X$ within the RSF 128. The tag reader's known coverage area also facilitates object location determinations. Accordingly, RFID tag read information and tag reader location information is stored in a data store 126. This information can be stored in the data store 126 using a server 124. Server 124 will be described in more detail below in relation to FIG. 4.

Figure 2:
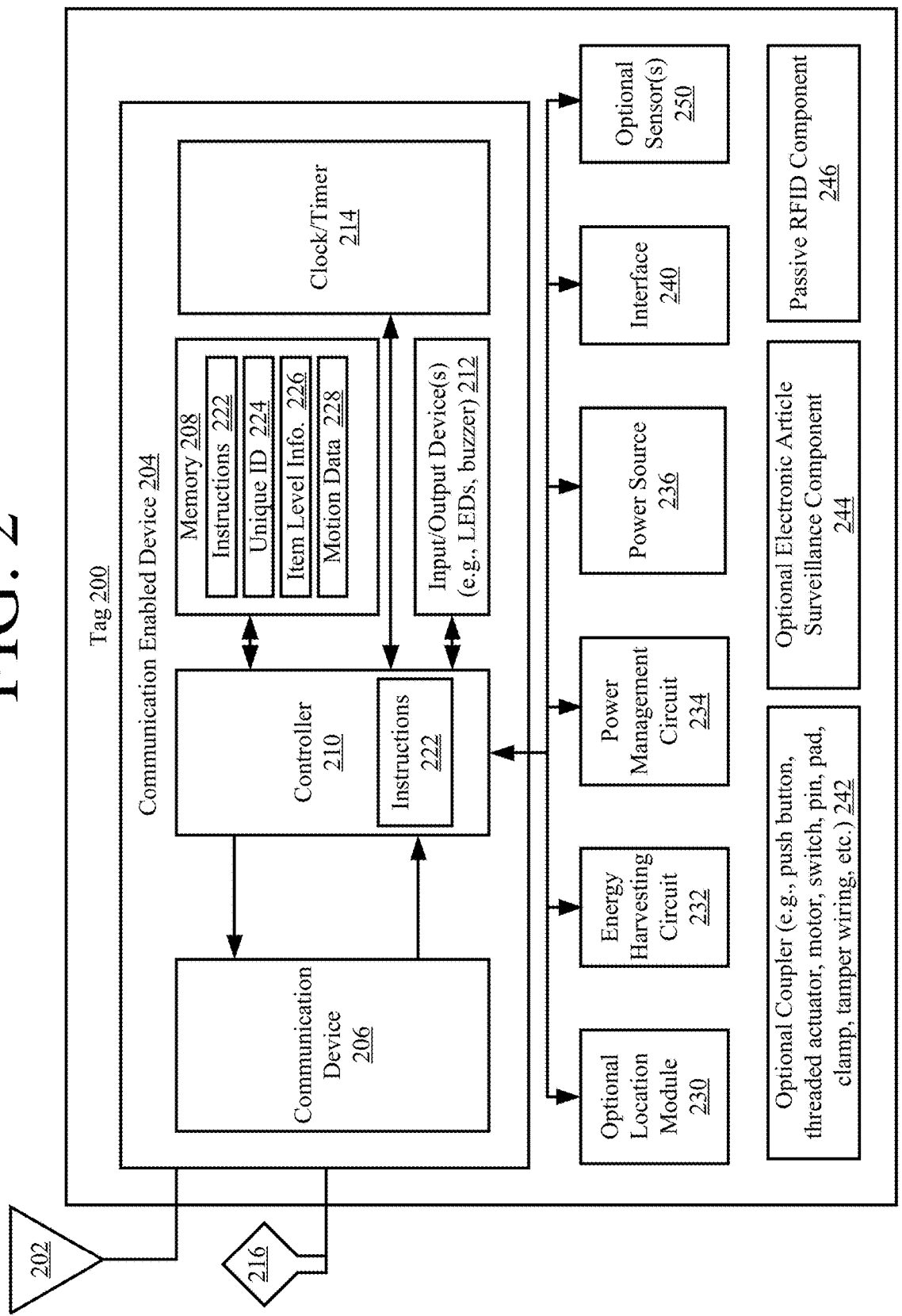
FIG. 2 is an illustration of an illustrative architecture for a tag.

Referring now to FIG. 2, there is an illustration of an illustrative architecture for a tag 200. RFID tags $112_1$, ..., $112_N$, $118_1$, ..., $118_X$ are the same as or similar to tag 200. As such, the discussion of tag 200 is sufficient for understanding the RFID tags $112_1$, ..., $112_N$, $118_1$, ..., $118_X$ of FIG. 1. Tag 200 is generally configured to perform operations to (a) minimize power usage so as to extend a power source's life (e.g., a battery or a capacitor), (b) minimize collisions with other tags so that the tag of interest can be seen at given times, (c) optimize useful information within an inventory system (e.g., communicate useful change information to a tag reader), and/or (d) optimize local feature functions.

The tag 200 can include more or less components than that shown in FIG. 2. However, the components shown are sufficient to disclose an illustrative embodiment implementing the present solution. Some or all of the components of the tag 200 can be implemented in hardware, software and/or a combination of hardware and software. The hardware includes, but is not limited to, one or more electronic circuits. The electronic circuit(s) may comprise passive components (e.g., capacitors and resistors) and active components (e.g., processors) arranged and/or programmed to implement the methods disclosed herein.

The hardware architecture of FIG. 2 represents a representative tag 200 configured to facilitate improved inventory management. In this regard, the tag 200 is configured for allowing data to be exchanged with an external device (e.g., tag reader 120 of FIG. 1 and/or server 124 of FIG. 1) via wireless communication technology. The wireless communication technology can include, but is not limited to, a Radio Frequency Identification ("RFID") technology, a Near Field Communication ("NFC") technology, and/or a Short Range Communication ("SRC") technology. For example, one or more of the following wireless communication technologies (is)are employed: Radio Frequency ("RF") communication technology; Bluetooth technology; WiFi technology; beacon technology; and/or LiFi technology. Each of the listed wireless communication technologies is well known in the art, and therefore will not be described in detail herein. Any known or to be known wireless communication technology or other wireless communication technology can be used herein without limitation.

The components 206-214 shown in FIG. 2 may be collectively referred to herein as a communication enabled device 204, and include a memory 208 and a clock/timer 214. Memory 208 may be a volatile memory and/or a non-volatile memory. For example, the memory 208 can include, but is not limited to, Random Access Memory ("RAM"), Dynamic RAM ("DRAM"), Static RAM ("SRAM"), Read Only Memory ("ROM") and flash memory. The memory 208 may also comprise unsecure memory and/or secure memory.

In some scenarios, the communication enabled device 204 comprises a Software Defined Radio ("SDR"). SDRs are well known in the art, and therefore will not be described in detail herein. However, it should be noted that the SDR can be programmatically assigned any communication protocol that is chosen by a user (e.g., RFID, WiFi, LiFi, Bluetooth, BLE, Nest, ZWave, Zigbee, etc.). The communication protocols are part of the device's firmware and reside in memory 208. Notably, the communication protocols can be downloaded to the device at any given time. The initial/default role (being an RFID, WiFi, LiFi, etc. tag) can be assigned at the deployment thereof. If the user desires to use another protocol at a later time, the user can remotely change the communication protocol of the deployed tag 200. The update of the firmware, in case of issues, can also be performed remotely.

As shown in FIG. 2, the communication enabled device 204 comprises at least one antenna 202, 216 for allowing data to be exchanged with the external device via a wireless communication technology (e.g., an RFID technology, an NFC technology and/or a SRC technology). The antenna 202, 216 is configured to receive signals from the external device and/or transmit signals generated by the communication enabled device 204. The antenna 202, 216 can comprise a near-field or far-field antenna. The antennas include, but are not limited to, a chip antenna or a loop antenna.

The communication enabled device 204 also comprises a communication device (e.g., a transceiver or transmitter) 206. Communication devices (e.g., transceivers or transmitters) are well known in the art, and therefore will not be described herein. However, it should be understood that the communication device 206 generates and transmits signals (e.g., RF carrier signals) to external devices, as well as receives signals (e.g., RF signals) transmitted from external devices. In this way, the communication enabled device 204 facilitates the registration, identification, location and/or tracking of an item (e.g., object $110_1$, ..., $110_N$, $116_1$, ..., or $116_X$ of FIG. 1) to which the tag 200 is coupled.

The communication enabled device 204 is configured so that it: communicates (transmits and receives) in accordance with a time slot communication scheme; and selectively enables/disables/bypasses the communication device (e.g., transceiver) or at least one communications operation based on output of a motion sensor 250. In some scenarios, the communication enabled device 204 selects: one or more time slots from a plurality of time slots based on the tag's unique identifier 224 (e.g., an Electronic Product Code ("EPC")); and/or determines a Window Of Time ("WOT") during which the communication device (e.g., transceiver) 206 is to be turned on or at least one communications operation is to be enabled subsequent to when and/or in response to when motion is detected by the motion sensor 250. The WOT can be determined based on environmental conditions (e.g., humidity, temperature, time of day, relative distance to a location device (e.g., beacon or location tag), a last known location of the security tag, a tag's internal bit value indicating whether the tag is coupled to a purchased item, etc.) and/or system conditions (e.g., amount of traffic, interference occurrences, etc.). In this regard, the tag 200 can include additional sensors not shown in FIG. 2.

The communication enabled device 204 also facilitates the automatic and dynamic modification of item level information 226 that is being or is to be output from the tag 200 in response to certain trigger events. The trigger events can include, but are not limited to, the tag's arrival at a particular facility (e.g., RSF 128 of FIG. 1), the tag's arrival in a particular country or geographic region, a date occurrence, a time occurrence, a price change, and/or the reception of user instructions.

Item level information 226 and a unique identifier ("ID") 224 for the tag 200 can be stored in memory 208 of the communication enabled device 204 and/or communicated to other external devices (e.g., tag reader 120 of FIG. 1 and/or server 124 of FIG. 1) via communication device (e.g., transceiver) 206 and/or interface 240 (e.g., an Internet Protocol or cellular network interface). For example, the communication enabled device 204 can communicate information specifying a timestamp, a unique identifier for an item, item description, item price, a currency symbol and/or location information to an external device. The external device (e.g., server) can then store the information in a database (e.g., database 126 of FIG. 1) and/or use the information for various purposes.

The communication enabled device 204 also comprises a controller 210 (e.g., a CPU) and input/output devices 212. The controller 210 can execute instructions 222 implementing methods for facilitating inventory counts and management. In this regard, the controller 210 includes a processor (or logic circuitry that responds to instructions) and the memory 208 includes a computer-readable storage medium on which is stored one or more sets of instructions 222 (e.g., software code) configured to implement one or more of the methodologies, procedures, or functions described herein. The instructions 222 can also reside, completely or at least partially, within the controller 210 during execution thereof by the tag 200. The memory 208 and the controller 210 also can constitute machine-readable media. The term "machine-readable media", as used here, refers to a single medium or multiple media (e.g., a centralized or distributed database, and/or associated caches and servers) that store the one or more sets of instructions 222. The term "machine-readable media", as used here, also refers to any medium that is capable of storing, encoding or carrying a set of instructions 222 for execution by the tag 200 and that cause the tag 200 to perform any one or more of the methodologies of the present disclosure.

The input/output devices 212 can include, but are not limited to, a display (e.g., an E Ink display, an LCD display and/or an active matrix display), a speaker, a keypad and/or light emitting diodes. The display is used to present item level information in a textual format and/or graphical format. Similarly, the speaker may be used to output item level information in an auditory format. The speaker and/or light emitting diodes may be used to output alerts for drawing a person's attention to the tag 200 (e.g., when motion thereof has been detected) and/or for notifying the person of a particular pricing status (e.g., on sale status) of the item to which the tag is coupled.

The clock/timer 214 is configured to determine a date, a time, and/or an expiration of a pre-defined period of time. Technique for determining these listed items are well known in the art, and therefore will not be described herein. Any known or to be known technique for determining these listed items can be used herein without limitation.

The tag 200 also comprises an optional location module 230. The location module 230 is generally configured to determine the geographic location of the tag at any given time. For example, in some scenarios, the location module 230 employs Global Positioning System ("GPS") technology and/or Internet based local time acquisition technology. The present solution is not limited to the particulars of this example. Any known or to be known technique for determining a geographic location can be used herein without limitation including relative positioning within a facility or structure.

The optional coupler 242 is provided to securely or removably couple the tag 200 to an item (e.g., object $110_1, \ldots, 110_N, 116_1, \ldots,$ or $116_X$ of FIG. 1). The coupler 242 includes, but is not limited to, a mechanical coupling means (e.g., a strap, clip, clamp, snap) and/or adhesive (e.g., glue or sticker). The coupler 242 is optional since the coupling can be achieved via a weld and/or chemical bond.

The tag 200 can also include a power source 236, an optional EAS component 244, and/or a passive/active/semi-passive RFID component 246. Each of the listed components 236, 244, 246 is well known in the art, and therefore will not be described herein. Any known or to be known battery, EAS component and/or RFID component can be used herein without limitation. The power source 236 can include, but is not limited to, a rechargeable battery and/or a capacitor.

As shown in FIG. 2, the tag 200 further comprises an energy harvesting circuit 232 and a power management circuit 234 for ensuring continuous operation of the tag 200 without the need to change the rechargeable power source (e.g., a battery). In some scenarios, the energy harvesting circuit 232 is configured to harvest energy from one or more sources (e.g., heat, light, vibration, magnetic field, and/or RF energy) and to generate a relatively low amount of output power from the harvested energy. By employing multiple sources for harvesting, the device can continue to charge despite the depletion of a source of energy. Energy harvesting circuits are well known in the art, and therefore will not be described herein. Any known or to be known energy harvesting circuit can be used herein without limitation.

In the power recharging mode, a rechargeable power source (e.g., power source 236 of FIG. 2) is recharged using energy (e.g., RF energy) harvested by an energy harvesting circuit (e.g., energy harvesting circuit 232 of FIG. 2) of the RFID tag. Notably, at least one communication operation and/or the RFID tag's communication device (e.g., communication device 206 of FIG. 2) is disabled or bypassed in the power recharging mode. Other functions/operations of the RFID tag may also be disabled in this mode for power conservation purposes.

As noted above, the tag 200 may also include a motion sensor 250. Motion sensors are well known in the art, and therefore will not be described herein. Any known or to be known motion sensor can be used herein without limitation. For example, the motion sensor 250 includes, but is not limited to, a vibration sensor, an accelerometer, a gyroscope, a linear motion sensor, a Passive Infrared ("PIR") sensor, a tilt sensor, and/or a rotation sensor.

The motion sensor 250 is communicatively coupled to the controller 210 such that it can notify the controller 210 when tag motion is detected. The motion sensor 250 also communicates sensor data to the controller 210. The sensor data is processed by the controller 210 to determine whether or not the motion is of a type for triggering enablement of the communication device (e.g., transceiver) 206 or at least one communications operation. For example, the sensor data can be compared to stored motion data 228 to determine if a match exists therebetween. More specifically, a motion pattern specified by the sensor data can be compared to a plurality of motion patterns specified by the stored motion data 228. The plurality of motion patterns can include, but are not limited to, a motion pattern for walking, a motion pattern for running, a motion pattern for vehicle transport, and/or a motion pattern for vibration caused by equipment or machinery in proximity to the tag (e.g., an air conditioner or fan). The type of movement (e.g., vibration or being carried) is then determined based on which stored motion data matches the sensor data. This feature of the present solution allows the tag 200 to selectively enable the communication device (e.g., transceiver) or at least one communications operation only when the tag's location within a facility is actually being changed (e.g., and not when a fan is causing the tag to simply vibrate).

In some scenarios, the tag 200 can be also configured to enter a sleep state in which at least the motion sensor triggering of communication operations is disabled. This is desirable, for example, in scenarios when the tag 200 is being shipped or transported from a distributor to a customer. In those or other scenarios, the tag 200 can be further configured to enter the sleep state in response to its continuous detection of motion for a given period of time. The tag can be transitioned from its sleep state in response to expiration of a defined time period, the tag's reception of a control signal from an external device, and/or the tag's detection of no motion for a period of time.

The power management circuit 234 is generally configured to control the supply of power to components of the tag 200. In the event all of the storage and harvesting resources deplete to a point where the tag 200 is about to enter a shutdown/brownout state, the power management circuit 234 can cause an alert to be sent from the tag 200 to a remote device (e.g., tag reader 120 or server 124 of FIG. 1). In response to the alert, the remote device can inform an associate (e.g., a store employee) so that (s)he can investigate why the tag 200 is not recharging and/or holding charge.

The power management circuit 234 is also capable of redirecting an energy source to the tag's 200 electronics based on the energy source's status. For example, if harvested energy is sufficient to run the tag's 200 function, the power management circuit 234 confirms that all of the tag's 200 storage sources are fully charged such that the tag's 200 electronic components can be run directly from the harvested energy. This ensures that the tag 200 always has stored energy in case harvesting source(s) disappear or lesser energy is harvested for reasons such as drop in RF, light or vibration power levels. If a sudden drop in any of the energy sources is detected, the power management circuit 234 can cause an alert condition to be sent from the tag 200 to the remote device (e.g., tag reader 120 or server 124 of FIG. 1). At this point, an investigation may be required as to what caused this alarm. Accordingly, the remote device can inform the associate (e.g., a store employee) so that (s)he can investigate the issue. It may be that other merchandise are obscuring the harvesting source or the item is being stolen.

The present solution is not limited to that shown in FIG. 2. The tag 200 can have any architecture provided that it can perform the functions and operations described herein. For example, all of the components shown in FIG. 2 can comprise a single device (e.g., an Integrated Circuit ("IC")). Alternatively, some of the components can comprise a first tag element (e.g., a Commercial Off The Shelf ("COTS") tag) while the remaining components comprise a second tag element communicatively coupled to the first tag element. The second tag element can provide auxiliary functions (e.g., motion sensing, etc.) to the first tag element. The second tag element may also control operational states of the first tag element. For example, the second tag element can selectively (a) enable and disable one or more features/operations of the first tag element (e.g., transceiver operations), (b) couple or decouple an antenna to and from the first tag element, (c) bypass at least one communications device or operation, and/or (d) cause an operational state of the first tag element to be changed (e.g., cause transitioning the first tag element between a power save mode and non-power save mode). In some scenarios, the operational state change can be achieved by changing the binary value of at least one state bit (e.g., from 0 to 1, or vice versa) for causing certain communication control operations to be performed by the tag 200. Additionally or alternatively, a switch can be actuated for creating a closed or open circuit. The present solution is not limited in this regard.

Figure 3:
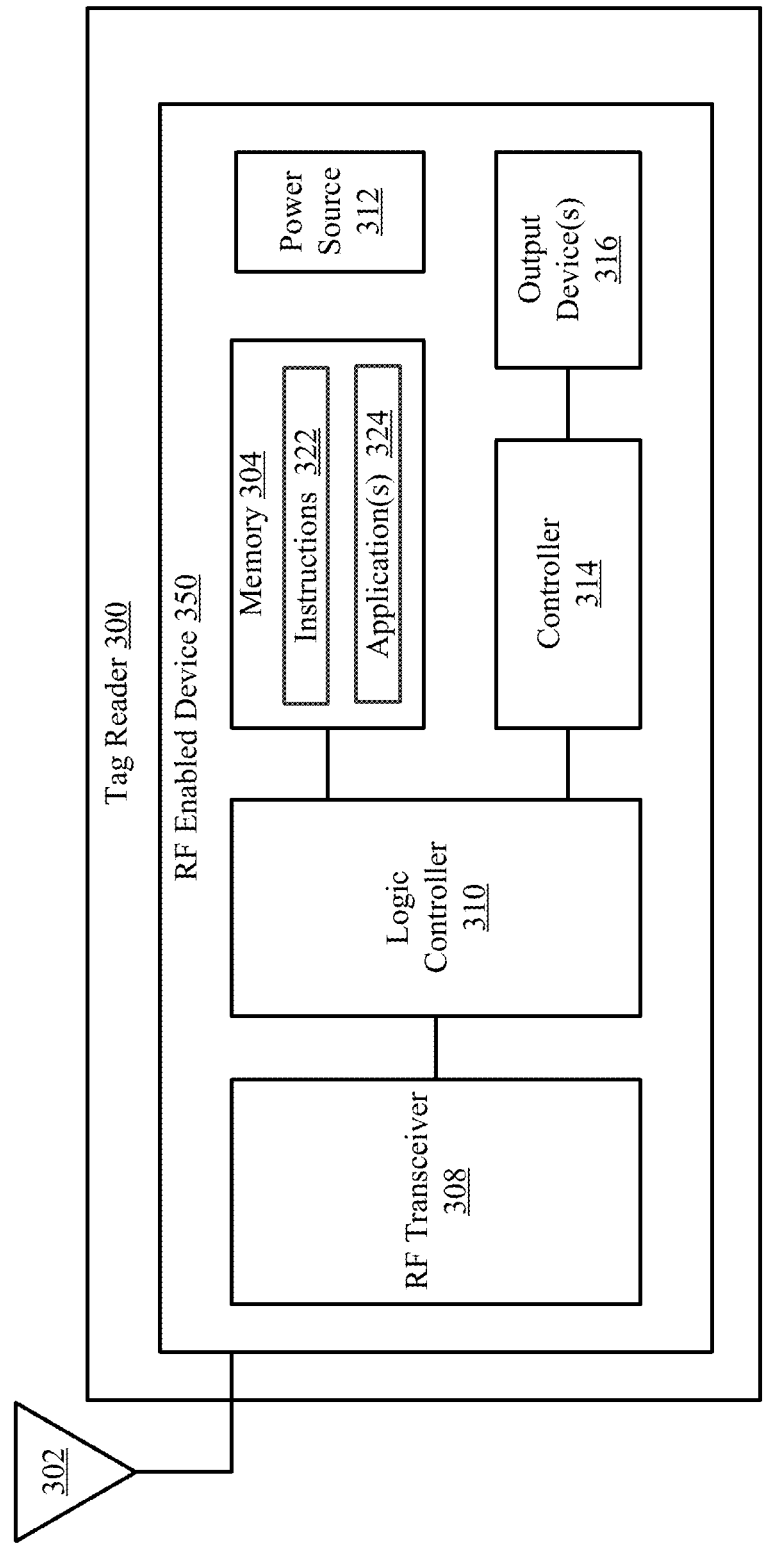
FIG. 3 is an illustration of an illustrative architecture for a tag reader.

Referring now to FIG. 3, there is provided a detailed block diagram of an illustrative architecture for a tag reader 300. Tag reader 120 of FIG. 1 is the same as or similar to tag reader 300. As such, the discussion of tag reader 300 is sufficient for understanding tag reader 120.

Tag reader 300 may include more or less components than that shown in FIG. 3. However, the components shown are sufficient to disclose an illustrative embodiment implementing the present solution. Some or all of the components of the tag reader 300 can be implemented in hardware, software and/or a combination of hardware and software. The hardware includes, but is not limited to, one or more electronic circuits. The electronic circuit may comprise passive components (e.g., capacitors and resistors) and active components (e.g., processors) arranged and/or programmed to implement the methods disclosed herein.

The hardware architecture of FIG. 3 represents an illustration of a representative tag reader 300 configured to facilitate improved inventory counts and management within an RSF (e.g., RSF 128 of FIG. 1). In this regard, the tag reader 300 comprises an RF enabled device 350 for allowing data to be exchanged with an external device (e.g., RFID tags $112_1, \ldots, 112_N, 118_1, \ldots, 118_X$ of FIG. 1) via RF technology. The components 304-316 shown in FIG. 3 may be collectively referred to herein as the RF enabled device 350, and may include a power source 312 (e.g., a battery) or be connected to an external power source (e.g., an AC mains).

The RF enabled device 350 comprises an antenna 302 for allowing data to be exchanged with the external device via RF technology (e.g., RFID technology or other RF based technology). The external device may comprise RFID tags $112_1, \ldots, 112_N, 118_1, \ldots, 118_X$ of FIG. 1. In this case, the antenna 302 is configured to transmit RF carrier signals (e.g., interrogation signals) to the listed external devices, and/or transmit data response signals (e.g., authentication reply signals) generated by the RF enabled device 350. In this regard, the RF enabled device 350 comprises an RF transceiver 308. RF transceivers are well known in the art, and therefore will not be described herein. However, it should be understood that the RF transceiver 308 receives RF signals including information from the transmitting device, and forwards the same to a logic controller 310 for extracting the information therefrom.

The extracted information can be used to determine the presence, location and/or type of movement of an RFID tag within a facility (e.g., RSF 128 of FIG. 1). Accordingly, the logic controller 310 can store the extracted information in memory 304, and execute algorithms using the extracted information. For example, the logic controller 310 can correlate tag reads with beacon reads to determine the location of the RFID tags within the facility. The logic controller 310 can also perform pattern recognition operations using sensor data received from RFID tags and comparison operations between recognized patterns and prestored patterns. The logic controller 310 can further select a time slot from a plurality of time slots based on a tag's unique identifier (e.g., an EPC), and communicate information specifying the selected time slot to the respective RFID tag. The logic controller 310 may additionally determine a WOT during which a given RFID tag's communication device (e.g., transceiver) or operation(s) is(are) to be turned on when motion is detected thereby, and communicate the same to the given RFID tag. The WOT can be determined based on environmental conditions (e.g., temperature, time of day, etc.) and/or system conditions (e.g., amount of traffic, interference occurrences, etc.). Other operations performed by the logic controller 310 will be apparent from the following discussion.

Notably, memory 304 may be a volatile memory and/or a non-volatile memory. For example, the memory 304 can include, but is not limited to, a RAM, a DRAM, an SRAM, a ROM, and a flash memory. The memory 304 may also comprise unsecure memory and/or secure memory. The phrase "unsecure memory", as used herein, refers to memory configured to store data in a plain text form. The phrase "secure memory", as used herein, refers to memory configured to store data in an encrypted form and/or memory having or being disposed in a secure or tamper-proof enclosure.

Instructions 322 are stored in memory for execution by the RF enabled device 350 and that cause the RF enabled device 350 to perform any one or more of the methodologies of the present disclosure. The instructions 322 are generally operative to facilitate determinations as to whether or not RFID tags are present within a facility, where the RFID tags are located within a facility, and/or which RFID tags are in motion at any given time. Other functions of the RF enabled device 350 will become apparent as the discussion progresses.

Figure 4:
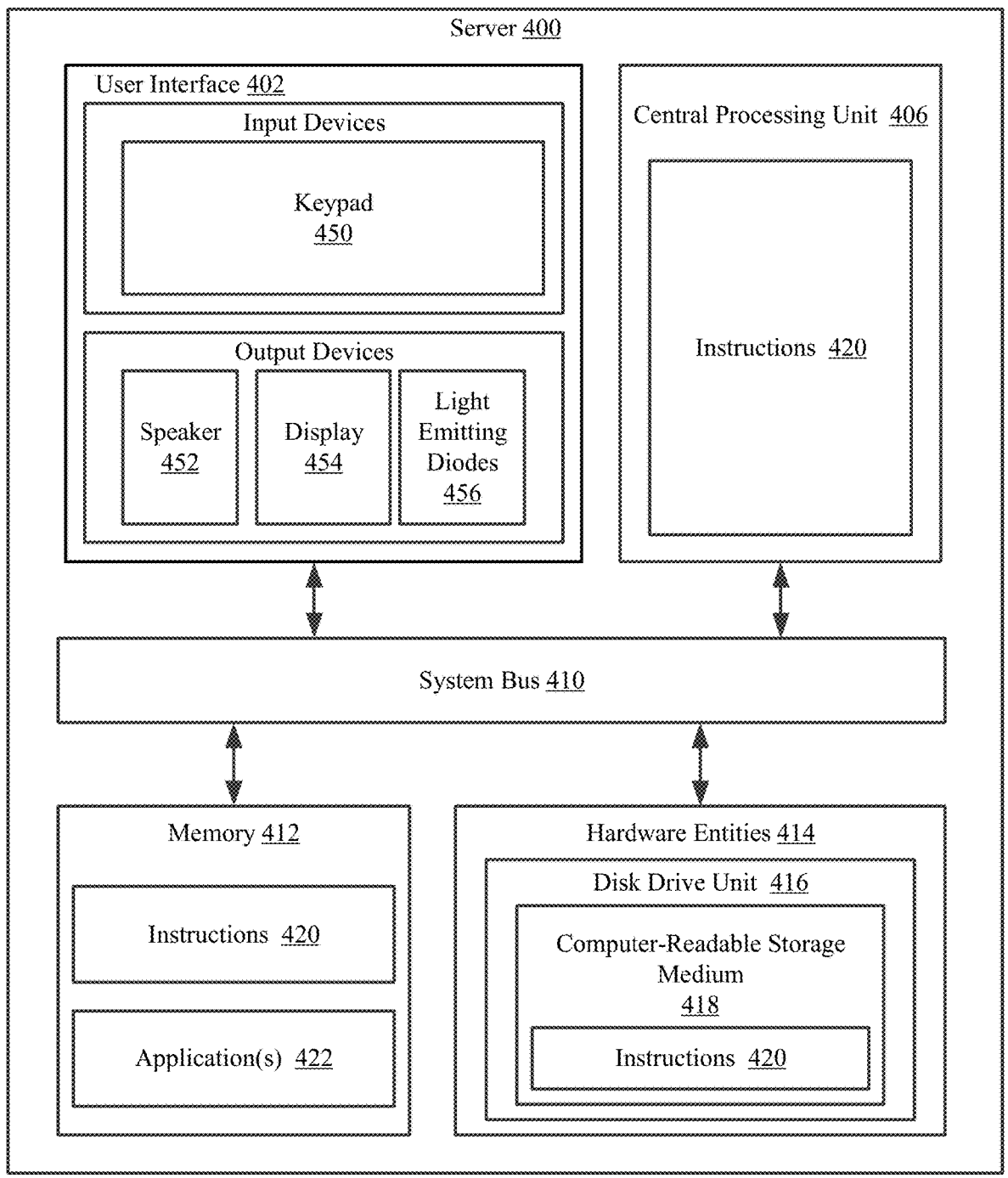
FIG. 4 is an illustration of an illustrative architecture for a server.

Referring now to FIG. 4, there is provided a detailed block diagram of an illustrative architecture for a server 400. Server 124 of FIG. 1 is the same as or substantially similar to server 400. As such, the following discussion of server 400 is sufficient for understanding server 124.

Notably, the server 400 may include more or less components than those shown in FIG. 4. However, the components shown are sufficient to disclose an illustrative embodiment implementing the present solution. The hardware architecture of FIG. 4 represents one embodiment of a representative server configured to facilitate inventory counts and management. As such, the server 400 of FIG. 4 implements at least a portion of a method for determining inventory using time slotted tag communications in accordance with the present solution.

Some or all the components of the server 400 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 4, the server 400 comprises a user interface 402, a CPU 406, a system bus 410, a memory 412 connected to and accessible by other portions of server 400 through system bus 410, and hardware entities 414 connected to system bus 410. The user interface can include input devices (e.g., a keypad 450) and output devices (e.g., speaker 452, a display 454, and/or light emitting diodes 456), which facilitate user-software interactions for controlling operations of the server 400.

At least some of the hardware entities 414 perform actions involving access to and use of memory 412, which can be a RAM, a disk driver and/or a Compact Disc Read Only Memory ("CD-ROM"). Hardware entities 414 can include a disk drive unit 416 comprising a computer-readable storage medium 418 on which is stored one or more sets of instructions 420 (e.g., software code) configured to implement one or more of the methodologies, procedures, or functions described herein. The instructions 420 can also reside, completely or at least partially, within the memory 412 and/or within the CPU 406 during execution thereof by the server 400. The memory 412 and the CPU 406 also can constitute machine-readable media. The term "machine-readable media", as used here, refers to a single medium or multiple media (e.g., a centralized or distributed database, and/or associated caches and servers) that store the one or more sets of instructions 420. The term "machine-readable media", as used here, also refers to any medium that is capable of storing, encoding or carrying a set of instructions 420 for execution by the server 400 and that cause the server 400 to perform any one or more of the methodologies of the present disclosure.

In some scenarios, the hardware entities 414 include an electronic circuit (e.g., a processor) programmed for facilitating the provision of a three-dimensional map showing locations of RFID tags within a facility and/or changes to said locations in near real-time. In this regard, it should be understood that the electronic circuit can access and run a software application 422 installed on the server 400. The software application 422 is generally operative to facilitate: the determination of RFID tag locations within a facility; the direction of travel of RFID tags in motion; and the mapping of the RFID tag locations and movements in a virtual three dimensional space. Other functions of the software application 422 will become apparent as the discussion progresses. Such other functions can relate to tag reader control and/or tag control.

Figure 6:
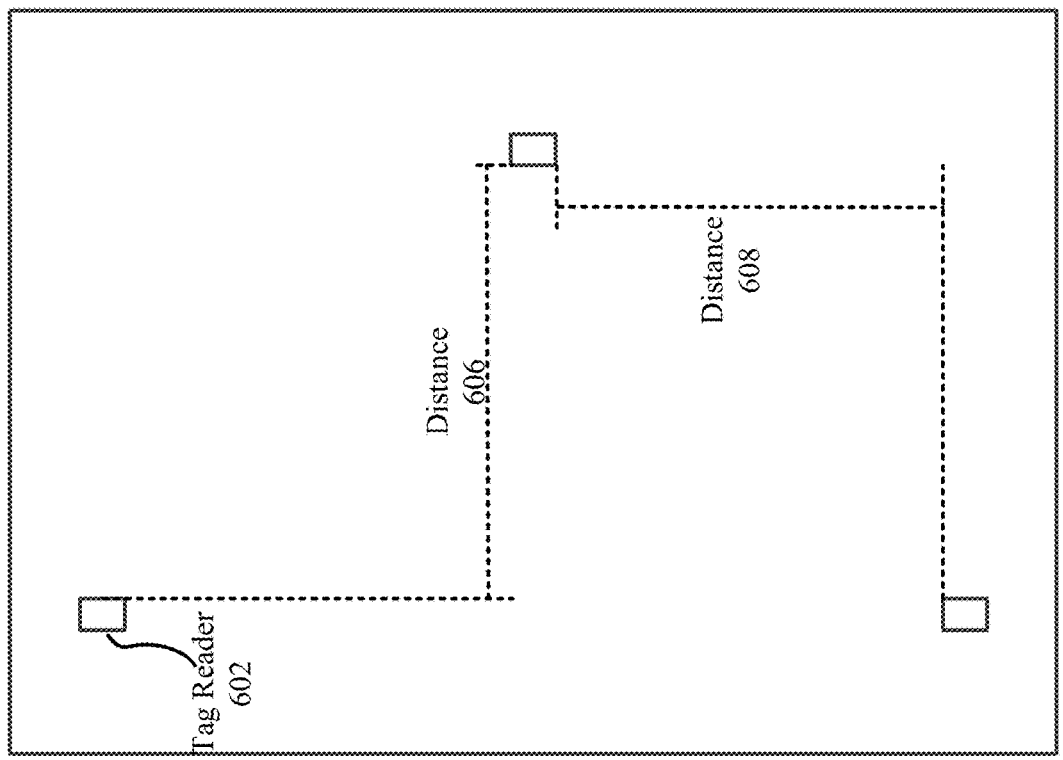
FIG. 6 is an illustration of another illustrative tag reader configuration.
Figure 5:
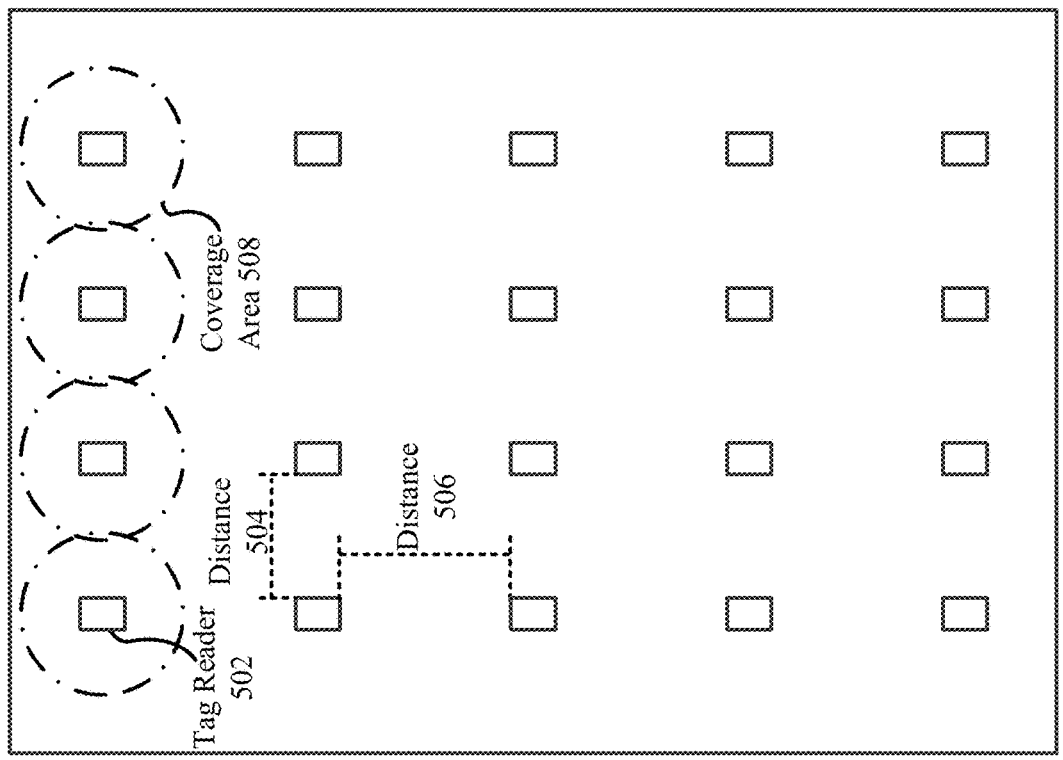
FIG. 5 is an illustration of an illustrative tag reader configuration.

Referring now to FIGS. 5-6, there are provided illustrations that are useful for understanding certain advantages of the present solution. As noted above, the present solution provides RFID tags which can be read by a tag reader located farther away therefrom as compared to that of conventional systems. FIG. 5 shows a tag reader layout for a conventional system. In FIG. 5, there are 20 tag readers 502 with overlapping coverage areas 508. The distance 504, 506 between adjacent tag readers is relatively small (e.g., 9-15 feet apart). In contrast, FIG. 6 shows a tag reader layout for a system implementing the present solution. In FIG. 6, there are advantageously a significantly smaller number of tag readers 602 needed to cover the same area. Accordingly, the distances 606, 608 (e.g., 90-150 feet apart) between adjacent tag readers 602 is much greater than the distances 504, 506 of FIG. 5. Consequently, the present solution has a less resource intensive and less costly infrastructure.

Figure 7A:
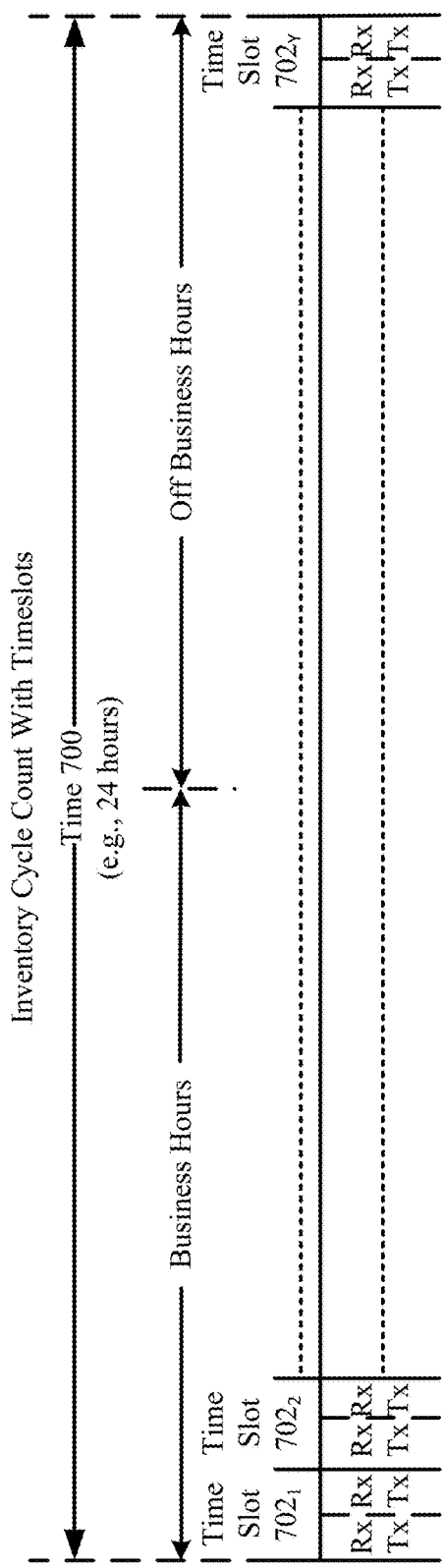
FIGS. 7A-7B (collectively referred to herein as "FIG. 7") provide illustrations that are useful for understanding an inventory cycle count using time slots for communications between tag readers and tags.

Referring now to FIG. 7, there are provided illustrations that are useful for understanding methods for determining inventory using time slotted tag communications. As shown in FIG. 7A, a period of time 700 (e.g., a 24 hour period) is segmented into a plurality of time slots $702_1, 702_2, \ldots, 702_Y$ having equal lengths (e.g., 1 second). During each time slot, at least one RFID tag (e.g., RFID tag $112_1$ of FIG. 1) (A) receives ("Rx") an interrogation signal transmitted from a tag reader (e.g., tag reader 120 of FIG. 1) and (B) transmits ("Tx") a response signal.

Figure 7B:
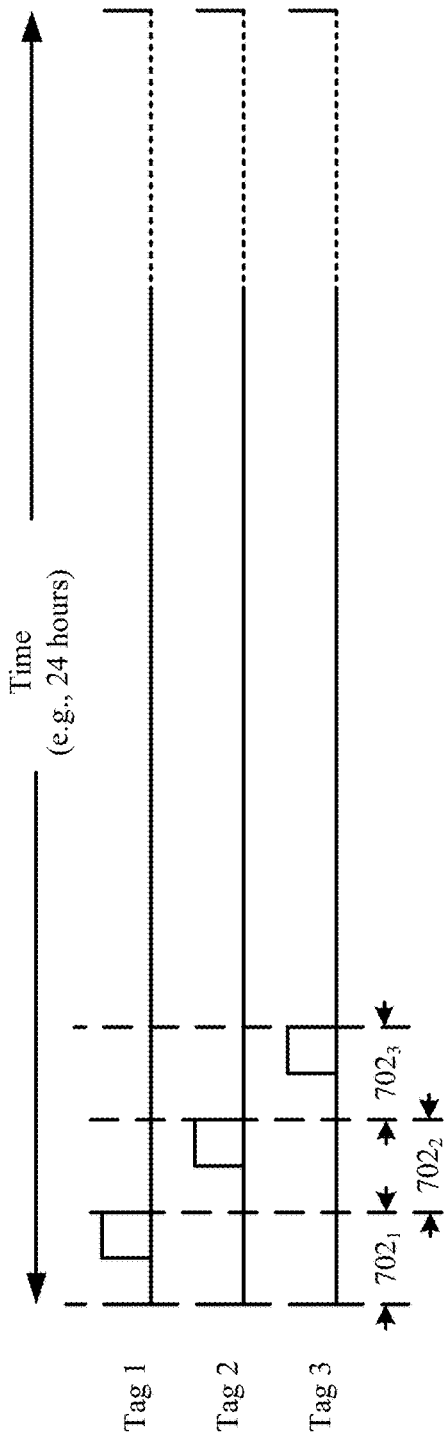

In some scenarios such as that shown in FIG. 7B, a single RFID tag is assigned to each time slot. For example, a first RFID tag is assigned to the first time slot $702_1$. A second RFID tag is assigned to a second time slot $702_2$. A third RFID tag is assigned to a third time slot $702_3$. This time slot assignment can be performed in accordance with a chaotic, random or pseudo-random number algorithm. Alternatively, the time slot assignment can be determined based on the unique codes of the tags (e.g., EPCs, Cyclic Redundancy Check ("CRC") codes, hash codes or outputs of randomizing algorithms). The time slot assignment can be performed by the RFID tags (e.g., RFID tags $112_1, \ldots, 112_N$, $118_1, \ldots, 118_X$ of FIG. 1), tag readers (e.g., tag reader(s) 120 of FIG. 1), and/or a remote server (e.g., server 124 of FIG. 1).

In some scenarios, the time slot allocations can be dynamically changed during system operations. For example, a relatively large number of tag read collisions are occurring in the system (e.g., system 100 of FIG. 1). Accordingly, the time slot allocations are changed so as to minimize such tag read collisions. The manner in which time slots are re-allocated can be determined by a single device (e.g., server 124 of FIG. 1) or by a plurality of devices (e.g., RFID tags $112_1, \ldots, 112_N, 118_1, \ldots, 118_X$, tag readers 120 and/or server 124 of FIG. 1).

Figure 8:
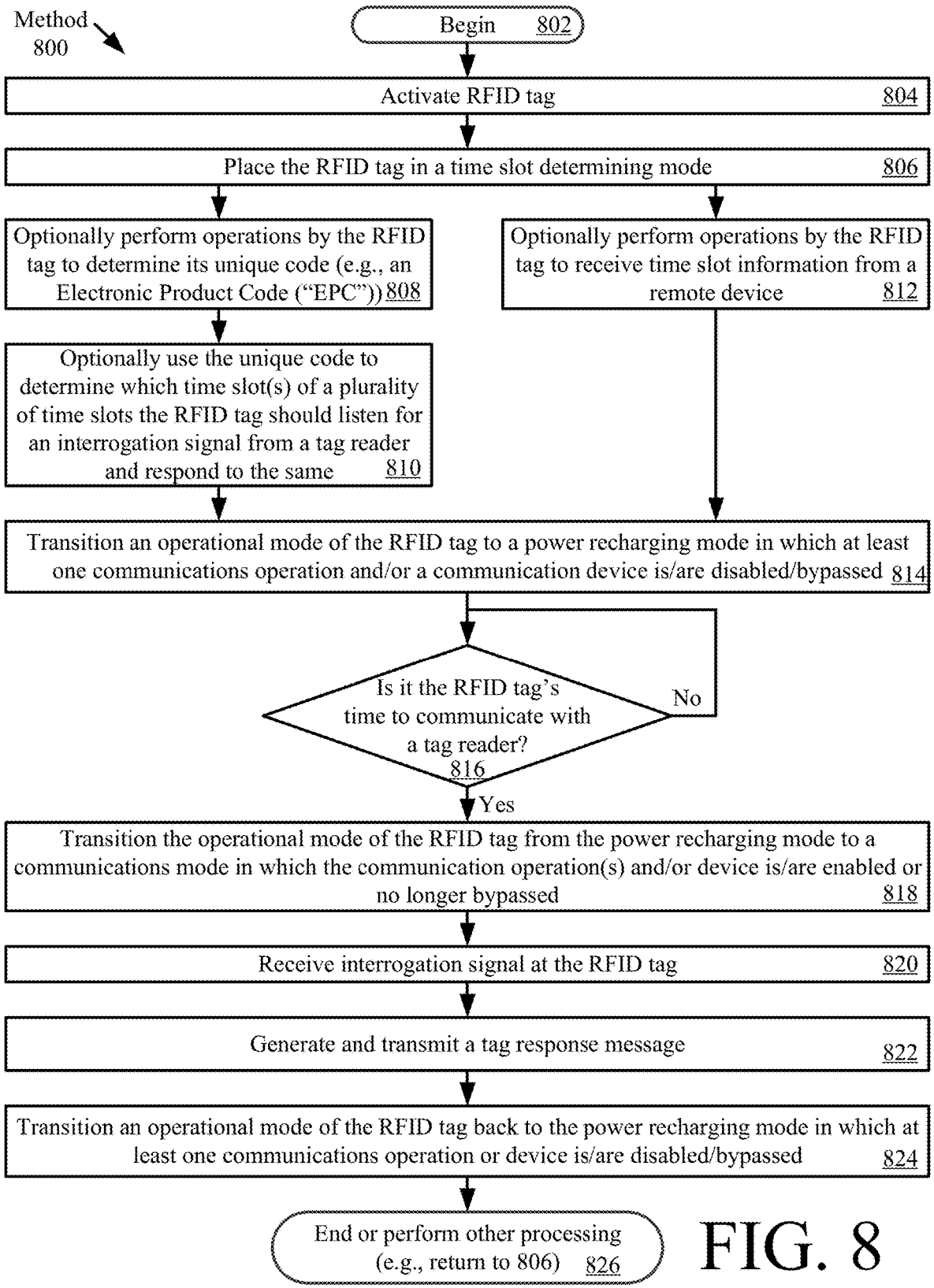
FIG. 8 is a flow diagram of an illustrative method for an inventory cycle count using time slots for communications between tag readers and tags.

Referring now to FIG. 8, there is a flow diagram of an illustrative method 800 for determining an inventory using a time slotted communications scheme such as that shown in FIGS. 7A-7B. Method 800 begins with 802 and continues with 804-806 where an RFID tag (e.g., RFID tags $112_1, \ldots, 112_N, 118_1, \ldots,$ or $118_X$ of FIG. 1) is activated and placed in a time slot determining mode.

In the time slot determining mode, the RFID tag is assigned to a time slot (e.g., time slot $702_1$ of FIG. 7) of a plurality of time slots (e.g., time slots $702_1, 702_2, \ldots, 702_Y$ of FIG. 7). This is achieved through (I) operations performed by the RFID tag and/or (II) operations performed by a remote device (e.g., tag reader 120 of FIG. 1 or server 124 of FIG. 1).

In the first case (I), operations 808-810 are performed by the RFID tag. These operations involve: determining the RFID tag's unique code (e.g., unique ID 224 of FIG. 2); and using the unique code to determine which time slot(s) the RFID tag should listen for an interrogation signal from a tag reader and respond to the same. In this regard, the RFID tag can be programed with an algorithm for translating the unique code to a time slot value or with a look-up table indicating a mapping of unique codes to time slot values. The translation can be achieved by using the unique code as an input to a pre-defined algorithm to compute a time slot value.

In the second case (II), operations are performed by the remote device(s). These operations involve: selectively assigning at least one time slot to the RFID tag; and communicating information identifying the selectively assigned time slot(s) to the RFID tag. The time slot assignment can be on a chaotic/random/pseudo-random algorithm and/or in accordance with a unique code-to-time slot translation or mapping scheme. Accordingly, FIG. 8 includes optional block 812 where the RFID tag receives time slot information from a remote device.

Upon completing 810 or 812, method 800 continues with 814 where an operational mode of the RFID tag is transitioned from the time slot determining mode to a power recharging mode. In some scenarios, the operational state or mode change is achieved by changing the binary value of at least one state or mode bit (e.g., from 0 to 1, or vice versa) for causing certain communication control operations to be performed by the RFID tag. Additionally or alternatively, a switch can be actuated for creating a closed or open circuit. The present solution is not limited in this regard.

Next, a decision is made as to whether it is time for the RFID tag to communicate with a tag reader. This decision can be achieved using knowledge of the time slot(s) assigned to the particular tag. If it is not the RFID tag's time to communicate with a tag reader [816:NO], then method 800 returns to 816. In contrast, if it is the RFID tag's time to communicate with a tag reader [816:YES], then method 800 continues with 818 where the operational mode of the RFID tag is transitioned from the power recharging mode to a communications mode in which at least one communications operations and/or communication device (e.g., transceiver) is enabled or no longer bypassed. Thereafter in 820, an interrogation signal is received at the RFID tag. Interrogation signals are well known in the art, and therefore will not be described herein. In response to the interrogation signal, the RFID tag generates and transmits a tag response message, as shown by 822. Tag response messages are well known in the art, and therefore will not be described herein. Still, it should be noted that the tag response message can include the RFID tag's unique identifier (e.g., unique identifier 224 of FIG. 2) therein. The present solution is not limited to the particulars of 820-822. For example, a number of iterations of communications operations (e.g., transmit and receive operations) can be performed prior to continuing to 824.

Next in 824, the operational mode of the RFID tag is transitioned back to the power recharging mode in which at least communications operations and/or device (e.g., transceiver) is/are disabled and/or bypassed. Subsequently, 826 is performed where method 800 ends or other processing is performed (e.g., return to 806).

The method 800 described above provides a solution to real time inventory, but does not include a way to detect changes to inventory due to removal of RFID tags from an RSF (e.g., RSF 128 of FIG. 1) between respective adjacent time slots (e.g., because of sale or theft). Accordingly, method 800 can be modified to include additional operations for detecting and accounting for tag movement at all times during an inventorying process. Such a modified method is discussed below in relation to FIGS. 9-13.

Figure 9:
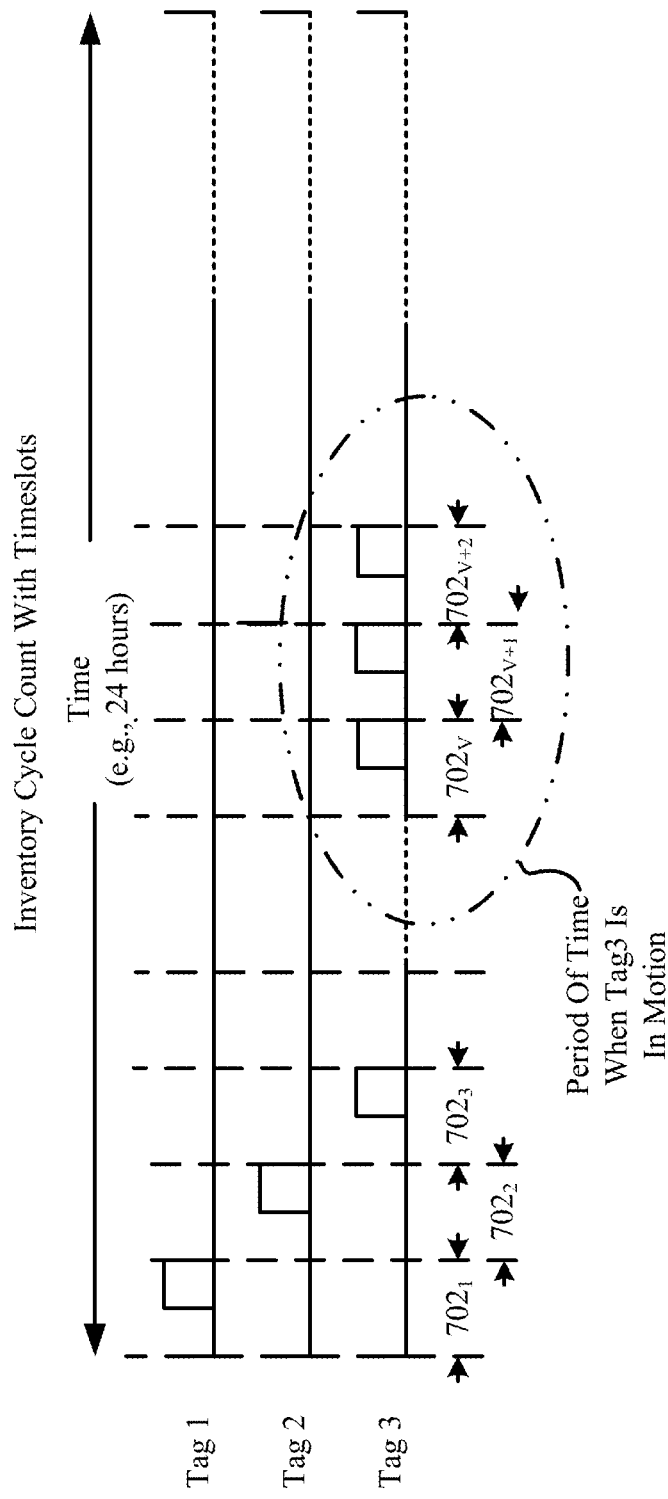
FIG. 9 is an illustration that is useful for understanding an inventory cycle count in which (a) time slots are used for communications between tag readers and tags and (b) a detection of tag motion causes communication enablement.

Referring now to FIG. 9, there is provided an illustration that is useful for understanding methods for determining inventory using motion triggered time slotted tag communications. As shown in FIG. 9, the third tag performs communication (e.g., transceiver) operations in time slots $702_V, 702_{V+1}, 702_{V+2}$ in addition to its assigned time slot $702_3$. These time slots $702_V, 702_{V+1}, 702_{V+2}$ occur during a period of time when the third tag is in motion. This allows tag readers to see moving RFID tags quickly, as well as helps at a Point Of Sale ("POS") and to determine whether the RFID tags were moved into a high risk area (e.g., a fitting room or bathroom).

Referring now to FIGS. 10-11, there are provided illustrations that are useful in understanding the contents of tag response messages. In some scenarios, the tag response message 1000 includes only a unique tag identifier 1002 (e.g., unique ID 224 of FIG. 2). In other scenarios, the tag response message 1100 includes a motion indicator 1104 in addition to the unique tag identifier 1102. The motion indicator 1104 indicates whether the tag is currently in motion, is in a given operational state/mode, and/or has a given motion sensor state.

Figure 12A:
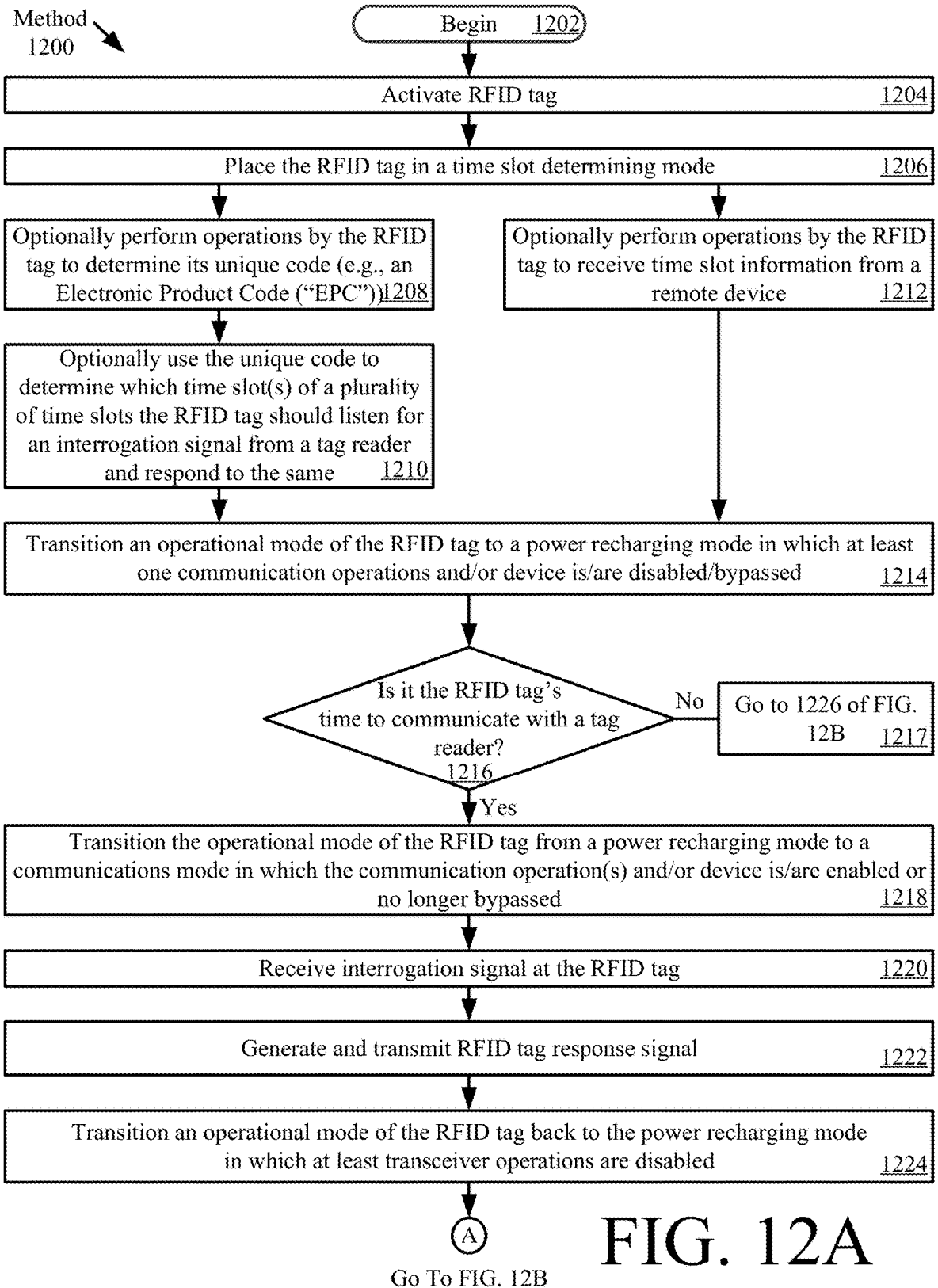
FIGS. 12A-12B (collectively referred to herein as "FIG. 12") provide a flow diagram of an illustrative method for an inventory cycle count.
Figure 12B:
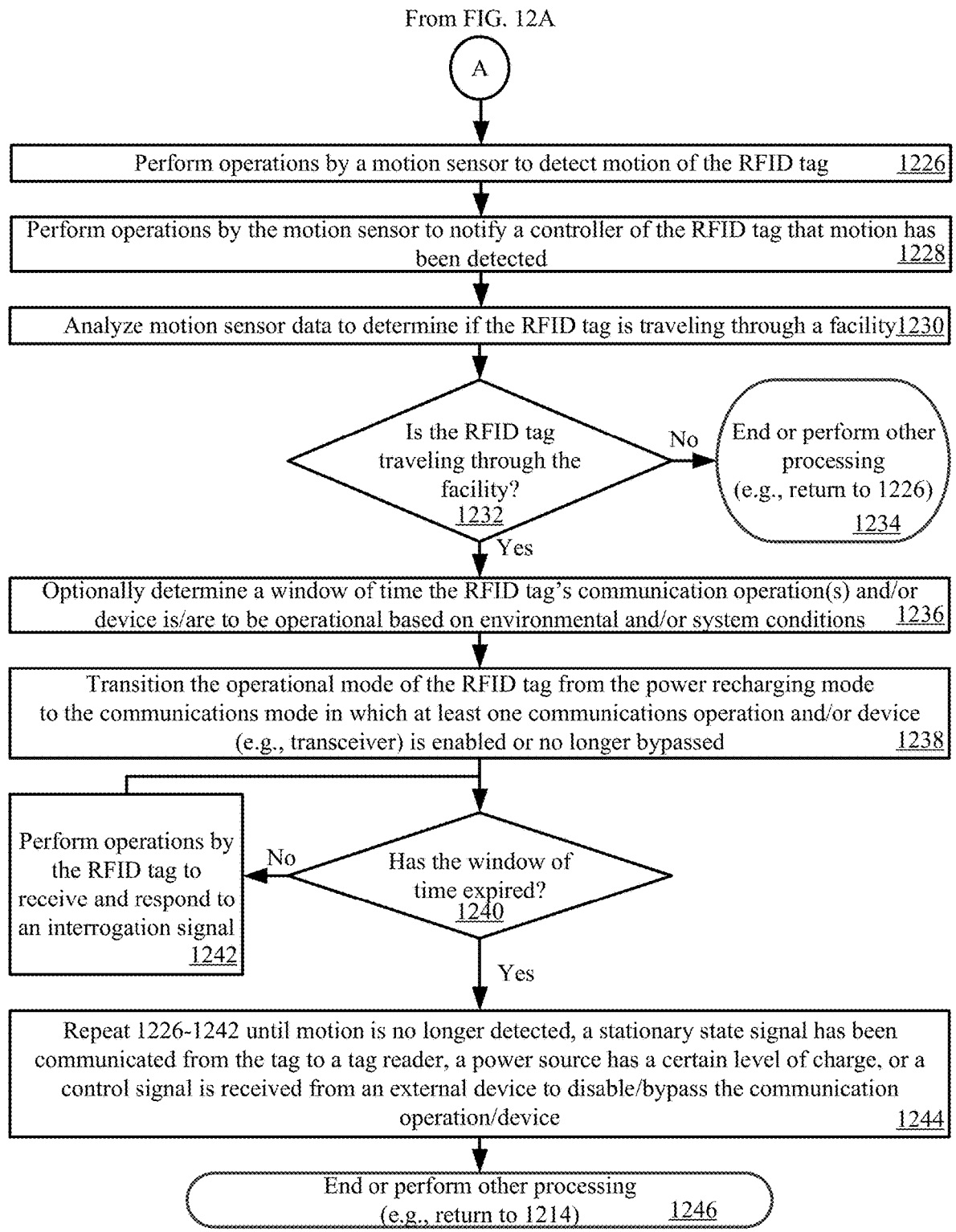

Referring now to FIG. 12, there is provided a flow diagram of an illustrative method 1200 for determining inventory using time slotted tag communications. Method 1200 begins with 1202 and continues with 1204-1224. 1204-1224 are the same as or substantially similar to 804-824 of FIG. 8. The above discussion of 804-824 is sufficient for understanding 1204-1224. Notably, a new block 1217 is provided in which method 800 continues to 1226 of FIG. 12B when a determination is made in 1216 that it is not the RFID tag's time to communicate with the tag reader.

Upon completing 1224, method 1200 continues with 1226 of FIG. 12B. As shown in FIG. 12B, 1226 involves performing operations by a motion sensor (e.g., motion sensor 250 of FIG. 2) to detect motion of the RFID tag (e.g., RFID tag 112$_1$, . . . , 112$_N$, 118$_1$, . . . , or 118$_X$ of FIG. 1). Next in 1228, the motion sensor performs operations to notify a controller (e.g., controller 210 of FIG. 2) of the RFID tag that motion has been detected. The motion sensor also provides motion sensor data to the controller. In 1230, the motion sensor data is analyzed to determine if the RFID tag is traveling through a facility. This analysis can be performed by the RFID tag's controller and/or a remote device (e.g., a tag reader or server). The analysis can involve detecting pre-defined patterns of movement specified in the motion sensor data (e.g., a walking pattern, a running pattern, or a vehicle traveling pattern). If a determination is made that the RFID tag is not traveling through a facility (e.g., RSF 128 of FIG. 1) [1232:NO], then 1234 is performed where method 1200 ends or other processing is performed (e.g., return to 1226).

In contrast, if a determination is made that the RFID tag is traveling through a facility [1232:YES], then 1236 is optionally performed where a WOT is determined during which the RFID tag's communication operation(s) and/or communication device (e.g., transceiver) is to be operational, enabled or no longer bypassed. 1236 is optional since the RFID tag can be pre-programed with a WOT value. In other scenarios, a value for the WOT is determined by the RFID tag and/or a remote device. The WOT value is determined based on environmental conditions and/or system conditions. Notably, the WOT value is variable. This feature of the present solution allows minimization of the RFID tag's system power, minimizes tag read collisions, and identification of moving RFID tags without reading all static/stationary RFID tags.

Once the RFID tag has knowledge of the WOT value, then 1238 is performed where its operational mode is transitioned from the power recharging mode to the communications mode in which at least one communication operation and/or communication device (e.g., transceiver) is enabled or no longer bypassed. In the communications mode, the RFID tag uses an internal clock/timer (e.g., clock/timer 214 of FIG. 1) to determine if the WOT has expired. If not [1240:NO], then the RFID tag performs operations in 1242 to receive and respond to at least one interrogation signal. If so [1240:YES], then 1226-1242 are repeated until motion is no longer detected, a stationary state signal has been communicated from the tag to a tag reader, a power source (e.g., power source 236 of FIG. 2) has a certain level of charge, and/or a control signal is received from an external device to disable or bypass the communication operations and/or device (e.g., transceiver). Subsequently, 1246 is performed where method 1200 ends or other processing is performed (e.g., return to 1214 of FIG. 12A).

The present solution has many advantages. For example, the present solution: solves real time, daily, accurate inventory with a low cost tag reader infrastructure; solves an overhead RFID as EAS problem; is able to accurately track moving tags; identify tags leaving a store even when there are a relatively large number of tags in proximity to the exit; and improves ecommerce processes by providing accurate inventory count and RFID tag locations at all times. The present solution is also greener since it limits the amount of time RF devices are enabled.

The present solution can be used in conjunction with other sensors, such as proximity sensors. For example, if proximity sensors detect the presence of individuals in the facility, then the stationary tag readers can be temporarily disabled (e.g., until there are no more people in the facility).

The RFID tags of the present solution are relatively small with good read range. This allows the RFID tags to be added to animals (e.g., humans, pets, etc.). In this case, the RFID tags can be configured to have enabled communication operations and/or devices (e.g., transceivers) only during times of detected movement thereof. The RFID tags could also be placed on wearable items (e.g., hats, belts, etc.) in a manner that does not interfere with the wearing humans.

Illustrative System Using RFID as an Adaptive Alarm Threshold

Figure 13:
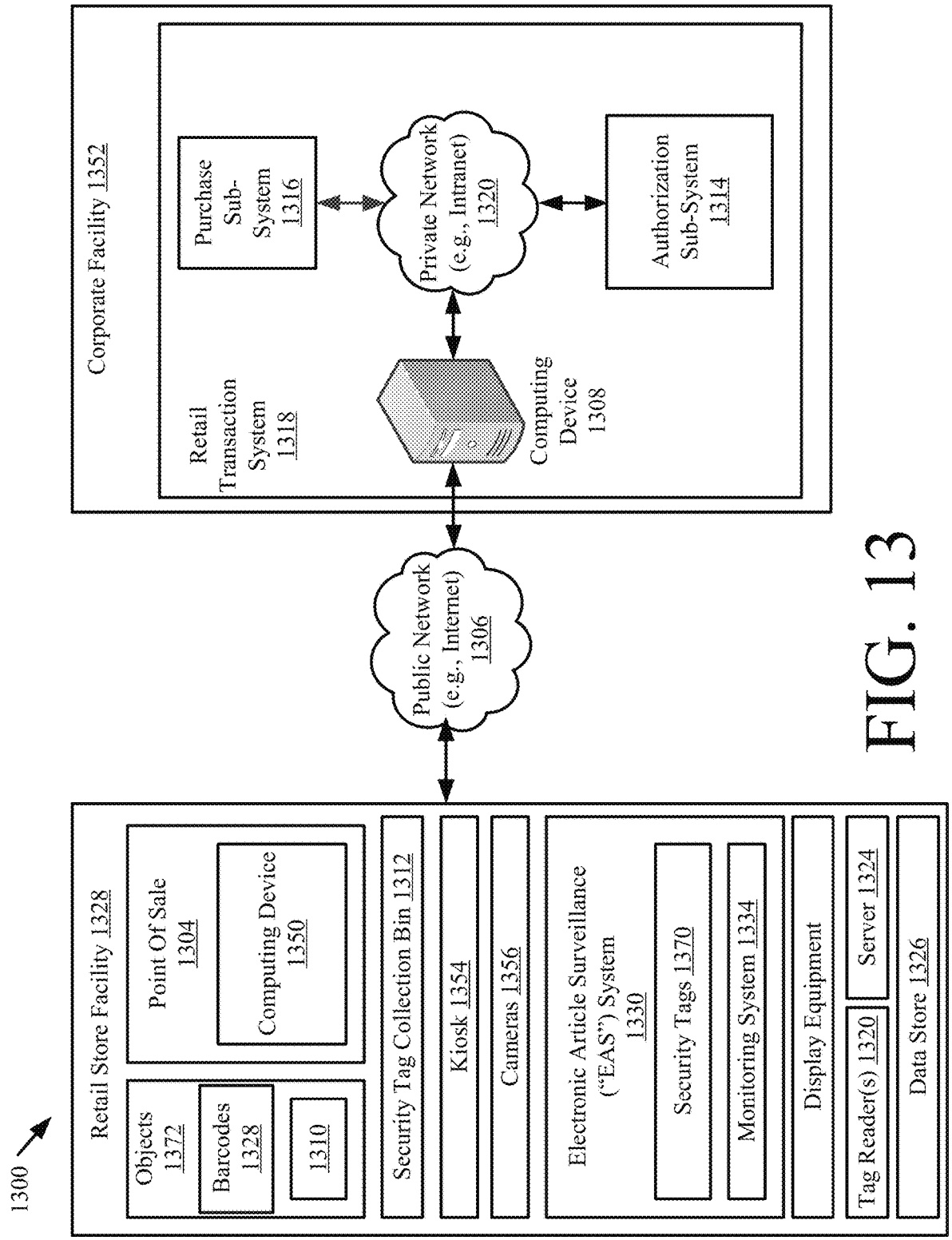
FIG. 13 is an illustration of an illustrative system.

Referring now to FIG. 13, there is provided an illustration of system 1300. System 1300 comprises an EAS system 1330 disposed in the retail store facility 1328. Retail store facility 1328 can comprise retail store facility 128 described above in relation to FIG. 1. The EAS system 1330 comprises a monitoring system 1334 and security tags 1370. The security tags 1370 can include one or more types of security tags. For example, the security tags include, but are not limited to, the security tags 112, 118 described above in relation to FIGS. 1-12B and/or other security tags (e.g., EAS security tags and/or dual technology EAS/RFID security tags that do not employ time slotting as described above). Although not shown in FIG. 13, the security tags 1370 are respectively attached to objects 1372 (which may include objects 110, 116 of FIG. 1), thereby protecting the objects from an unauthorized removal from the retail store facility 1328.

The monitoring system 1334 establishes a surveillance zone (not shown) within which the presence of the security tags 1370 can be detected. The surveillance zone is established at an access point (not shown) for the retail store facility 1328. The monitoring system 1334 can either determine the need to alarm due to the mere presence of the tag in the surveillance zone or by determining that the tag is moving/transitioning out of the doorway and is coupled to an unsold object (e.g., by using an algorithm described in U.S. Pat. No. 9,519,811 or other alarm detection algorithm).

During store hours, a customer (not shown) may desire to purchase the object(s). The customer can purchase the object(s) using a Point Of Sale ("POS") 1304. The POS 1304 can include, but is not limited to, a self-checkout POS station, a Mobile POS ("MPOS") station, or a MPOS device. In all scenarios, a retail transaction application executing on a computing device 1350 of the POS 1304 facilitates the exchange of data between the objects 1372, security tags 1370, customer, and/or Retail Transaction System ("RTS") 1318 of a corporate facility 1352. For example, after the retail transaction application is launched, the customer is prompted to start a retail transaction process for purchasing the objects. The retail transaction process can be started simply by performing a user software interaction, such as depressing a key on a keypad of the computing device 1350 or touching a button on a touch screen display of the computing device 1350.

In the MPOS scenarios, the computing device 1350 comprises a handheld communication device running the retail transaction application. The handheld communication device includes, but is not limited to, a cellular phone, a smart phone, a portable computer, a tablet, or a personal digital assistant. In some scenarios, the retail transaction application performs a check at the time of installation on the computing device 1350. The check is performed to confirm that the computing device 1350 has an NFC capability and that this capability is enabled. If the computing device 1350 does not have an NFC capability, then the user is notified of this fact. The user may also be provided with information as to how to make the computing device 1350 NFC enabled, and/or what versions of the computing device 1350 are NFC enabled. If the NFC capability is not enabled, then the user of the computing device 1350 is notified of this fact and instructed to enable the same. The retail transaction application allows the user to input payment information and set personal preferences.

Subsequently, the retail transaction application can optionally communicate with the RTS 1318 to obtain information relating to sales and/or promotions being offered by the RSF 128. This information is then displayed on a display screen of the computing device 1350.

When the customer is ready to purchase an item, the customer may manually input into the retail transaction application object information. Alternatively or additionally, the customer may place the computing device 1350 of the POS 1304 in proximity of the object, or vice versa. As a result of this placement, the POS 1304 obtains object information from the object. The object information includes any information that is useful for purchasing the object, such as an object identifier and an object purchase price. In some scenarios, the object information may even include an identifier of the security tag attached thereto. The object information can be communicated from the object to the computing device 1350 of the POS 1304 via a wireless communication, such as a barcode communication, RFID communication, or an NFC.

In the barcode scenario, the object 1372 has a barcode 1328 attached to an exposed surface thereof. The term "barcode", as used herein, refers to a pattern or symbol that contains embedded data. Barcodes may include, for example, one-dimensional barcodes, two dimensional barcodes (such as matrix codes, Quick Response ("QR") codes, Aztec codes and the like), or three-dimensional bar codes. The embedded data can include, but is not limited to, a unique identifier of the object and/or a purchase price of the object. The barcode 1328 is read by a barcode scanner/reader (not shown in FIG. 1) of the POS 1304. Barcode scanners/readers are well known in the art. Any known or to be known barcode scanner/reader can be used herein without limitation.

In the RFID scenarios, the object information is obtained from the security tag 1370. If the security tag 1370 comprises a time slot based security tag 112, 118, then the security tag is able to respond to signals from the POS 1304 since its communications operations were enabled as a result of detected motion thereof, and the current time is still within the selected WOT.

In the NFC scenarios, the object 1372 may comprise an NFC enabled device 1310. The NFC enabled device 1310 can be separate from the security tag or comprise the security tag. An NFC communication occurs between the NFC enabled device 1310 and the computing device 1350 over a relatively small distance (e.g., N centimeters or N inches, where N is an integer such as twelve). The NFC communication may be established by touching components 1372, 1350 together or bringing them in close proximity such that an inductive coupling occurs between inductive circuits thereof. In some scenarios, the NFC operates at 13.56 MHz and at rates ranging from 106 kbit/s to 848 kbit/s. The NFC may be achieved using NFC transceivers configured to enable contactless communication at 13.56 MHz. NFC transceivers are well known in the art, and therefore will not be described in detail herein. Any known or to be known NFC transceivers can be used herein without limitation.

After the POS 1304 obtains the object information, payment information is input into the retail transaction application of POS 1304. The payment information can include, but is not limited to, a customer loyalty code, payment card information, and/or payment account information. The payment information can be input manually, via an electronic card reader (e.g., a magnetic strip card reader), or via a barcode reader. Electronic card readers and barcode readers are well known in the art, and therefore will not be described herein. Any known or to be known electronic card reader and/or barcode reader can be used herein without limitation. The payment information can alternatively or additionally be obtained from a remote data store based on a customer identifier or account identifier. In this case, the payment information can be retrieved from stored data associated with a previous sale of an article to the customer.

Upon obtaining the payment information, the POS 1304 automatically performs operations for establishing a retail transaction session with the RTS 1318. The retail transaction session can involve: communicating the object information and payment information from the POS 1304 to the RTS 1318 via a public network 1306 (e.g., the Internet); completing a purchase transaction by the RTS 1318; and communicating a response message from the RTS 1318 to the POS 1304 indicating that the object has been successfully or unsuccessfully purchased. The purchase transaction can involve using an authorized payment system, such as a bank Automatic Clearing House ("ACH") payment system, a credit/debit card authorization system, or a third party system (e.g., PayPal®, SolidTrust Pay® or Google Wallet®).

The purchase transaction can be completed by the RTS 1318 using the object information and payment information. In this regard, such information may be received by a computing device 1308 of the RTS 1318 and forwarded thereby to a sub-system of a private network 1320 (e.g., an Intranet). For example, the object information and purchase information can also be forwarded to and processed by a purchase sub-system 1316 to complete a purchase transaction. When the purchase transaction is completed, a message is generated and sent to the POS 1304 indicating whether the object has been successfully or unsuccessfully purchased.

If the object has been successfully purchased, then a security tag detaching/deactivation process can be started automatically by the RTS 1318 or by the POS 1304. Alternatively, the user (not shown in FIG. 13) can start the security tag detaching/deactivation process by performing a user-software interaction using the POS 1304. In all three scenarios, the security tag is detached from the object, the EAS component of the security tag is deactivated, and/or the RFID component of the security tag is deactivated. Once the security tag has been detached or deactivated, the customer can carry the object through the surveillance zone without setting off the alarm.

In some scenarios, the RFID component of the security tag is not deactivated. Accordingly, some solutions merely report the tag to the inventory system, which remembers that the specific EPC is sold or safe at the exit. Other solutions modify the EPC value on the tag to indicate a sold status. Still other solutions physically remove or damage the tag, or instruct the tag to become inoperable. The advantages of these solutions is that less physical labor is performed and the tag may be reused if the item is returned.

Notably, system 1300 is able to detect and track object movement through the RSF 1328 using RFID technology, such as that discussed above in relation to FIGS. 1-12B. In this regard, the security tags 1370 include RFID components which can be read by tag readers 1320. Tag readers are well known in the art, and therefore will not be described herein. Any known or to be known tag reader can be used herein without limitation. The tag readers 1320 can be the same as or similar to tag reader 120 of FIG. 1. During tag reads, various information is obtained from the RFID components. This information can include, but is not limited to, unique identifiers for the security tags and/or item level information (e.g., UPCs for the objects to which the security tags are coupled).

The tag readers 1320 and/or computing device 1308 is(are) able to detect and track security tag movement through the RSF 1328, while also identifying which moving security tags are coupled to objects that have not been successfully purchased and are moving towards and/or through exits of the RSF 1328. This information is used by the computing device 1308 to determine a number of unsold objects leaving and/or possibly attempting to leave the RSF 1328 during a given period of time (e.g., N seconds, minutes, hours, days, weeks, etc.). This number is referred to herein as n.

n is compared to a threshold value thr (e.g., 10). If n is equal to or greater than thr, then the EAS system 1330 is caused to issue an audible alarm and/or a visual alarm. This alarm issuance is useful for triggering a response when at least a threshold number of objects is leaving the RSF 1328 at one time. In contrast, if n is less than thr, then operations are performed to suppress all alarming by the EAS system 1330, cause issuance of discreet alarms (e.g., visual and/or low volume audio alarm(s)), and/or report a loss event to store personnel (e.g., via a text message, email, etc.).

The threshold value thr can be modified manually by a user and/or automatically based on certain criteria. For example, the threshold value thr is automatically reduced when an alarm rate per unit of time is relatively low (e.g., less than 5 per day) and automatically increased when the alarm rate per unit of time is relatively high (e.g., greater than 5 per day thereby hitting a prescribed limit). The present solution is not limited to the particulars of this example.

The present solution has many novel features. For example, the present solution provides a system 1300 with the ability to: alarm (e.g., visual and auditory) based upon a threshold number of tags leaving the RSF 1328 during a given period of time rather than on every single tag; automatically adjust the threshold value thr by a factor; and share the threshold value thr with other systems.

Illustrative Methods for Operating an EAS System

Figure 14A:
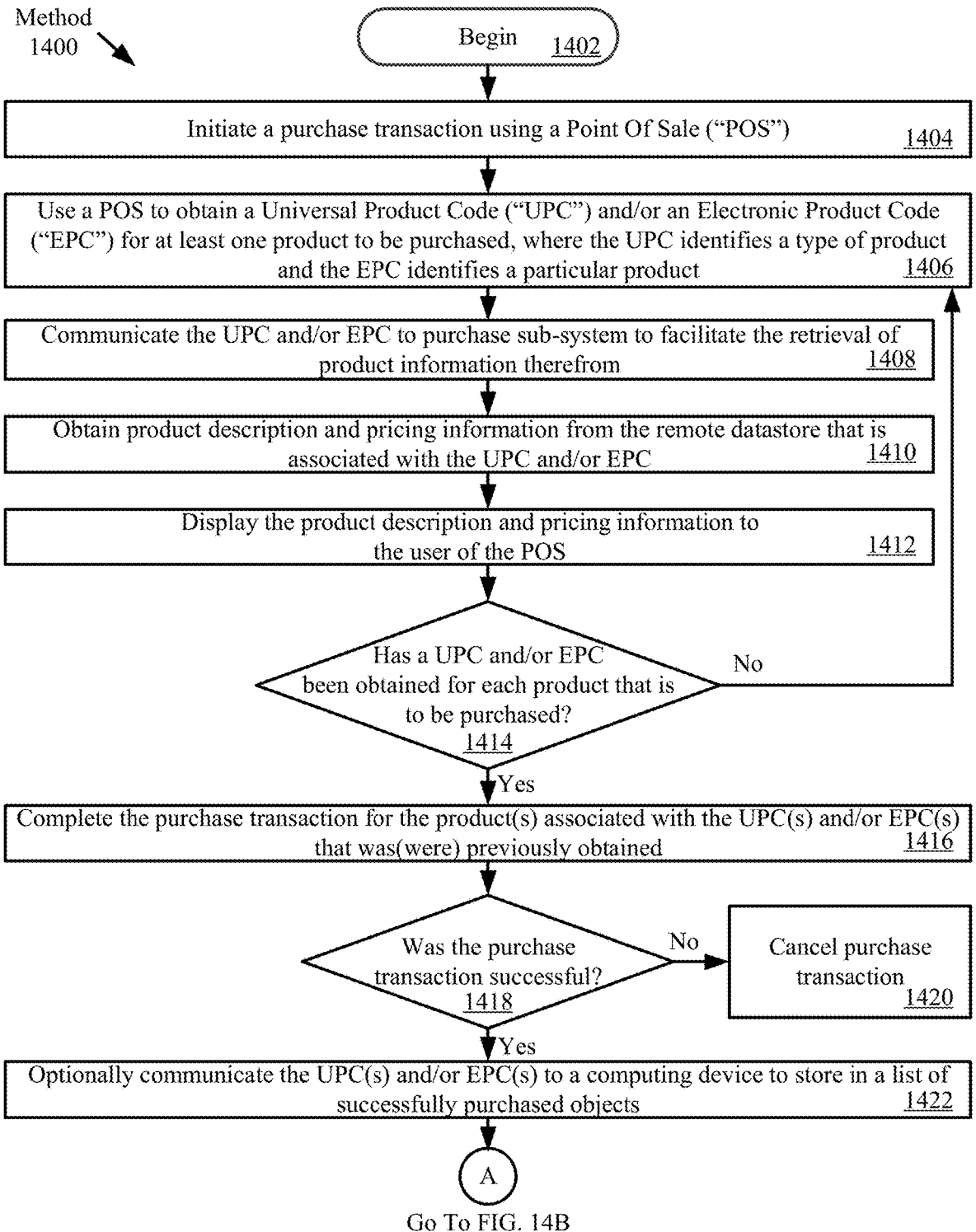
FIGS. 14A-14B (collectively referred to herein as "FIG. 14") provide a flow diagram of an illustrative method for operating an EAS system.

Referring now to FIG. 14, there is provided a flow diagram of an illustrative method 1400 for operating an EAS system (e.g., EAS system 1330 of FIG. 13). As shown in FIG. 14A, method 1400 begins with step 1402 and continues with step 1404 where a purchase transaction is initiated using a POS (e.g., POS 1304 of FIG. 13). Techniques for initiating such a purchase transaction are well known in the art, and therefore will not be described herein. After completing step 1404, step 1406 is performed where the POS is used to obtain a UPC and/or an EPC for at least one product to be purchased. The UPC uniquely identifies a type of product. The EPC uniquely identifies a particular product. The UPC and/or EPC can be obtained using one or more scanning technologies. The scanning technologies include, but are not limited to, RFID technology, NFC technology and/or barcode technology. In some scenarios, the UPC and/or EPC is obtained from the security tag (e.g., security tag 1370 of FIG. 13). If the security tag is a time slot based security tag (e.g., tag 112 of FIG. 1, 118 of FIG. 1, or 1370 of FIG. 13), then the communications operations thereof are enabled or no longer being bypassed (responsive to detected motion thereof) such that the tag can respond to messages received thereat from the POS.

The UPC and/or EPC is then communicated to a purchase sub-system (e.g., purchase sub-system 1316 of FIG. 13) to facilitate the retrieval of product information therefrom, as shown by step 1408. In this regard, the purchase sub-system may comprise or have access to a remote datastore in which product information was pre-stored. The product information includes, but is not limited to, product descriptions and purchase prices. The purchase sub-system then uses the UPC and/or EPC to obtain any associated product description and pricing information from the remote datastore, as shown by step 1410. The product description and pricing information is communicated in step 1412 to the POS so that it can be displayed to the user thereof.

At this time, a decision 1414 is made as to whether a UPC and/or EPC has(have) been obtained for each product that is to be purchased. If a UPC and/or EPC has(have) not been obtained for each product that is to be purchased [1414:NO], then method 1400 returns to 1406. In contrast, if the UPC and/or EPC has(have) been obtained for each product that is to be purchased [1414:YES], method 1400 continues with 1416. 1416 involves completing the purchase transaction for the product(s) associated with the UPC(s) and/or EPC(s) previously obtained. If the purchase transaction was not successful [1418:NO], then 1420 is performed where the purchase transaction is canceled. In contrast, if the purchase transaction was successful [1418:YES], then optional 1422 is performed where the UPC(s) and/or EPC(s) are communicated to a computing device (e.g., computing device 1308 of FIG. 13). At the computing device, the UPC(s) and/or EPC(s) are stored in one or more lists of successfully purchased products. Upon completing 1422, method 1440 continues with 1424 of FIG. 14B.

Figure 14B:
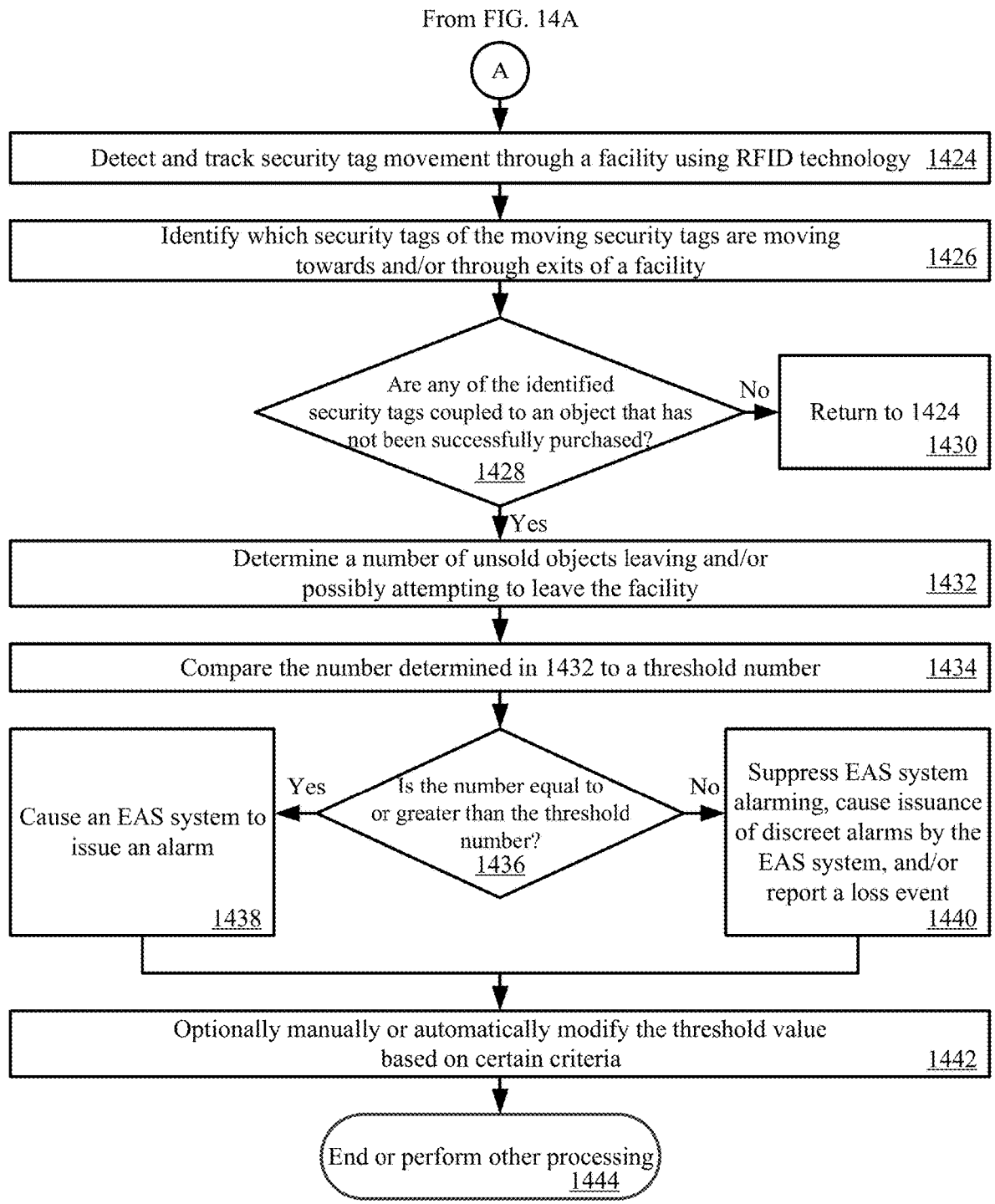

As shown in FIG. 14B, 1424 involves detecting and tracking security tag movement through a facility (e.g., the RSF 1328 of FIG. 13) using RFID technology. In 1426, a tag reader (e.g., tag reader 1320 of FIG. 13) and/or computing device (e.g., computing device 1308 of FIG. 13) identify which security tags of the moving security tags are moving towards and/or through exits of a facility. If all of the identified security tags are coupled to objects that have been successfully purchased [1428:NO], then 1430 is performed where method 1400 returns to 1424. In contrast, if one or more of the identified security tags are coupled to objects that have not been successfully purchased [1428:YES], then 1432 is performed where the number n of unsold objects leaving the facility and/or possibly attempting to leave the facility is determined.

The number n is compared to a threshold number thr in 1434. If the number is equal to or greater than the threshold number [1436:YES], then 1438 is performed where an EAS system is caused to issue an alarm. The alarm can include, but is not limited to, an audible alarm and/or a visual alarm (e.g., a red blinking light). If the number is less than the threshold number [1436:NO], then 1440 is performed where all EAS system alarming is suppressed, the EAS system is caused to issue one or more discreet alarms (e.g., a blue light with no audio), and/or a loss is reported.

Upon completing 1438 or 1440, optional 1442 may be performed. 1442 involves manually or automatically modifying the threshold value based on certain criteria. For example, the threshold value thr is reduced when an alarm rate per unit of time is relatively low (e.g., less than 5 per day) and increased when the alarm rate per unit of time is relatively high (e.g., greater than 5 per day thereby hitting a prescribed limit). Subsequently, 1444 is performed where method 1400 ends or other processing is performed.

Figure 15:
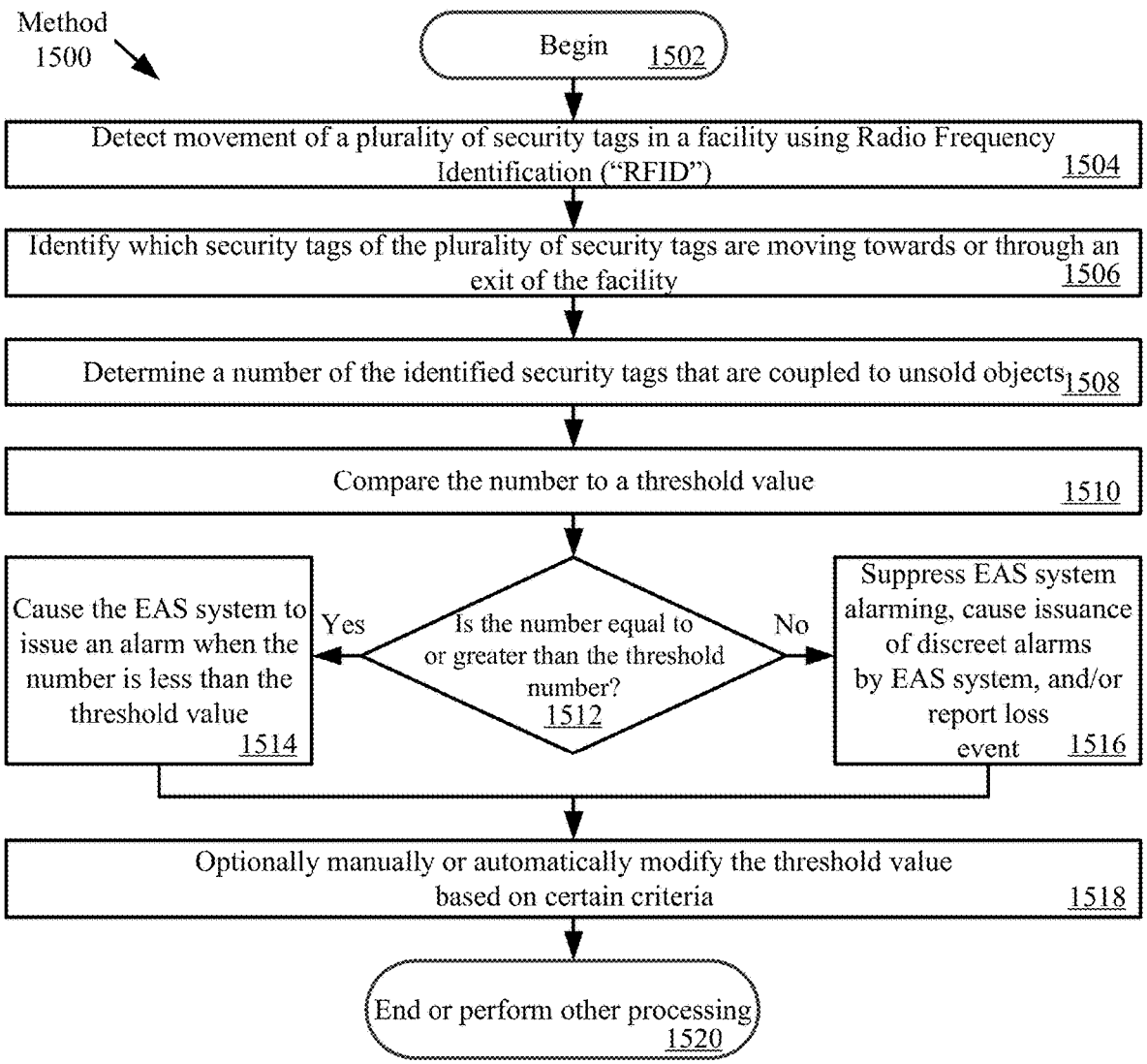
FIG. 15 provides a flow diagram of another illustrative method for operating an EAS system.

Referring now to FIG. 15, there is provided a flow diagram of an illustrative method 1500 for operating an EAS system (e.g., EAS system 1330 of FIG. 13). Method 1500 begins with 1502 and continues with 1504 where movement of a plurality of security tags (e.g., security tags 1370 of FIG. 13) in a facility (e.g., RSF 1328 of FIG. 13) is detected using RFID (e.g., RFID components 246 of FIG. 2, tag reader(s) 1320 of FIG. 13, and/or a computing device 1308 of FIG. 13). In 1506, an identification is made as to which security tags of the plurality of security tags are moving towards or through an exit of the facility. In 1508, a determination is made as to the number of identified security tags that are coupled to unsold objects. The number is compared to a threshold value (e.g., 3).

When the number is greater than or equal to the threshold value [1512:YES], the EAS system is caused to issue an alarm as shown by 1514. Techniques for causing an EAS system to issue an alarm are well known in the art, and therefore will not be described herein. Any known or to be known method for causing EAS system alarm issuance can be used herein without limitation.

When the number is less than the threshold value [1512: NO], then one or more actions are taken in 1516. These actions include, but are not limited to, suppressing EAS system alarming, causing issuance of discreet alarms by the EAS system, and/or reporting a loss event to a person (e.g., a store manager) or enterprise system (e.g., RTS 1318 of FIG. 13). The discreet alarm can comprise a visual alarm (e.g., emission of a continuous or flashing blue light) and can be absent of any auditory sound.

Upon completing 1514 or 1516, optional 1518 is performed where the threshold value is manually or automatically modified based on certain criteria. For example, the threshold value is reduced when an alarm rate per unit of time is below a given value and increased when an alarm rate per unit of time is above a given value. Subsequently, 1520 is performed where method 1500 ends or other processing is performed.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for operating an Electronic Article Surveillance ("EAS") system, comprising:
    detecting movement of a plurality of security tags in a facility using Radio Frequency Identification ("RFID");
    identifying a first subset of security tags of the plurality of security tags that are moving towards an exit of the facility or are in a surveillance zone;
    determining a second subset of security tags of the first subset of security tags that are coupled to unsold objects;
    comparing a number of security tags in the second subset to a threshold value;
    causing the EAS system to issue an alarm when the number of security tags in the second subset is greater than or equal to the threshold value and to suppress the alarm when the number of security tags in the second subset is less than the threshold value; and
    automatically modifying the threshold value based on certain criteria.

2. The method according to claim 1, further comprising reporting a loss when the alarm is suppressed.

3. The method according to claim 1, further comprising causing the EAS system to issue a discreet alarm when the number of security tags in the second subset is less than the threshold value.

4. The method according to claim 3, wherein the discreet alarm comprises a visual alarm output at an exit of the facility or at a location remote from the exit.

5. The method according to claim 3, wherein the discreet alarm is absent of any auditory sound.

6. The method according to claim 1, further comprising reporting a loss when the number of security tags in the second subset is greater than or equal to the threshold value.

7. The method according to claim 1, wherein the threshold value is reduced when an alarm rate per unit of time is below a given value.

8. The method according to claim 1, wherein the threshold value is increased when an alarm rate per unit of time is above a given value.

9. A system, comprising:
    a processor; and
    a non-transitory computer-readable storage medium comprising programming instructions that are configured to cause the processor to implement a method for operating an Electronic Article Surveillance ("EAS") system, wherein the programming instructions comprise instructions to:
        detect movement of a plurality of security tags in a facility using Radio Frequency Identification ("RFID");
        identify a first subset of security tags of the plurality of security tags that are moving towards an exit of the facility or are in a surveillance zone;
        determine a second subset of security tags of the first subset of security tags that are coupled to unsold objects;
        compare a number of security tags in the second subset to a threshold value;

cause the EAS system to issue an alarm when the number of security tags in the second subset is greater than or equal to the threshold value and to suppress the alarm when the number of security tags in the second subset is less than the threshold value; and automatically modify the threshold value based on certain criteria.

10. The system according to claim 9, wherein the programming instructions further comprise instructions to report a loss when the alarm is suppressed.

11. The system according to claim 9, wherein the programming instructions further comprise instructions to cause the EAS system to issue a discreet alarm when the number of security tags in the second subset is less than the threshold value.

12. The system according to claim 11, wherein the discreet alarm comprises a visual alarm output at an exit of the facility or at a location remote from the exit.

13. The system according to claim 11, wherein the discreet alarm is absent of any auditory sound.

14. The system according to claim 9, wherein the programming instructions further comprise instructions to report a loss when the number of security tags in the second subset is greater than or equal to the threshold value.

15. The system according to claim 9, wherein the threshold value is reduced when an alarm rate per unit of time is below a given value.

16. The system according to claim 9, wherein the threshold value is increased when an alarm rate per unit of time is above a given value.

17. A method for operating an Electronic Article Surveillance ("EAS") system, comprising:
  detecting movement of a plurality of security tags in a facility using Radio Frequency Identification ("RFID");
  identifying which security tags of the plurality of security tags are moving towards an exit of the facility or are in a surveillance zone;
  determining a number of the identified security tags that are coupled to unsold objects;
  comparing the number to a threshold value;
  causing the EAS system to issue an alarm when the number is greater than or equal to the threshold value; and
  automatically modifying the threshold value based on certain criteria.

18. A system, comprising:
a processor; and
a non-transitory computer-readable storage medium comprising programming instructions that are configured to cause the processor to implement a method for operating an Electronic Article Surveillance ("EAS") system, wherein the programming instructions comprise instructions to:
  detect movement of a plurality of security tags in a facility using Radio Frequency Identification ("RFID");
  identify which security tags of the plurality of security tags are moving towards an exit of the facility or are in a surveillance zone;
  determine a number of the identified security tags that are coupled to unsold objects;
  compare the number to a threshold value;
  cause the EAS system to issue an alarm when the number is greater than or equal to the threshold value; and
  automatically modify the threshold value based on certain criteria.

19. The method according to claim 17, wherein the threshold value is reduced when an alarm rate per unit of time is below a given value.

20. The method according to claim 17, wherein the threshold value is increased when an alarm rate per unit of time is above a given value.

21. The system according to claim 18, wherein the threshold value is reduced when an alarm rate per unit of time is below a given value.

22. The system according to claim 18, wherein the threshold value is increased when an alarm rate per unit of time is above a given value.

* * * * *